US012715952B2

(12) United States Patent
Yukimura et al.

(10) Patent No.: US 12,715,952 B2
(45) Date of Patent: Aug. 25, 2026

(54) HIGH STRENGTH HYDROGENATED POLYMERS, AND RUBBER COMPOSITIONS INCORPORATING SAME

(71) Applicant: Bridgestone Corporation, Chuo-ku (JP)

(72) Inventors: Noriaki Yukimura, Chuo-ku (JP); Michael R. Beaulieu, Bolton, MA (US); Zengquan Qin, Nashville, TN (US); Jeffrey M. Magistrelli, Richfield, OH (US); Walter A. Salamant, Akron, OH (US); Ryan J. Hue, Akron, OH (US); Shu Wang, Basking Ridge, NJ (US); Laura S. Kocsis, Copley, OH (US)

(73) Assignee: Bridgestone Corporation, Chuo-ku (JP)

( * ) Notice: Subject to any disclaimer, the term of this patent is extended or adjusted under 35 U.S.C. 154(b) by 407 days.

(21) Appl. No.: 17/253,366

(22) PCT Filed: Jun. 20, 2019

(86) PCT No.: PCT/US2019/038167

§ 371 (c)(1),
(2) Date: Dec. 17, 2020

(87) PCT Pub. No.: WO2019/246359

PCT Pub. Date: Dec. 26, 2019

(65) Prior Publication Data

US 2021/0340306 A1 Nov. 4, 2021

Related U.S. Application Data

(60) Provisional application No. 62/687,605, filed on Jun. 20, 2018.

(51) Int. Cl.

| | |
|---|---|
| ***C08C 19/02*** | (2006.01) |
| ***C08F 293/00*** | (2006.01) |
| ***C08K 3/36*** | (2006.01) |

(52) U.S. Cl.

CPC .......... *C08F 293/005* (2013.01); *C08C 19/02* (2013.01); *C08K 3/36* (2013.01); *C08F 2438/00* (2013.01); *C08F 2800/20* (2013.01); *C08F 2810/00* (2013.01)

(58) Field of Classification Search

CPC ....... C08C 19/02; C08K 3/36; C08F 293/005; C08F 2438/00; C08F 2800/20; C08F 2810/00

USPC .......................................................... 524/572

See application file for complete search history.

(56) References Cited

U.S. PATENT DOCUMENTS

| | | | | |
|---|---|---|---|---|
| 2005/0171276 | A1* | 8/2005 | Matsuda | ................ C09J 151/04 524/572 |
| 2009/0030138 | A1 | 1/2009 | Suzuki et al. | |
| 2009/0124730 | A1 | 5/2009 | Matsuda | |
| 2015/0361210 | A1 | 12/2015 | Nosaka et al. | |
| 2017/0240724 | A1 | 8/2017 | Yamashiro | |

FOREIGN PATENT DOCUMENTS

| | | | |
|---|---|---|---|
| CN | 1522265 | A * | 8/2004 |
| CN | 1630669 | A * | 6/2005 |
| EP | 0661298 | A2 | 7/1995 |
| EP | 1245585 | A2 | 10/2002 |
| EP | 1293535 | A2 | 3/2003 |
| EP | 2272878 | A1 | 1/2011 |
| EP | 2963087 | A1 | 1/2016 |
| EP | 3064546 | A1 | 9/2016 |
| EP | 3916045 | A1 | 12/2021 |
| JP | 2002201333 | A | 7/2002 |
| JP | 2004043746 | A * | 2/2004 |
| JP | 2004059741 | A * | 2/2004 |
| JP | 2008045074 | A | 8/2006 |
| JP | 4007546 | B2 * | 11/2007 |
| JP | 4060105 | B2 * | 3/2008 |
| JP | 4097939 | B2 * | 6/2008 |
| JP | 2008274067 | A | 11/2008 |
| JP | 2012036300 | A | 2/2012 |
| KR | 20040014574 | A * | 2/2004 |
| WO | 03091334 | | 11/2003 |
| WO | 2003091339 | A1 | 9/2005 |
| WO | 2004003027 | A1 | 10/2005 |

(Continued)

OTHER PUBLICATIONS

Extended European Search Report issued Feb. 22, 2022, for European Application No. 19822677.1.

International Search Report and Written Opinion in International Patent Application No. PCT/US201/038167 dated Oct. 18, 2019.

Japanese Patent Office Action in Japanese Patent Application No. 2020-567614 dated Dec. 17, 2021.

European Search Report issued Oct. 12, 2021 in EP Application No. 21178325.3.

*Primary Examiner* — Kelechi C Egwim

(74) *Attorney, Agent, or Firm* — Meredith E. Hooker; Stephanie M. Williams

(57) ABSTRACT

Embodiments of the present disclosure are directed to functionalized copolymers produced by copolymerization of at least one conjugated diolefin monomer and at least one vinyl monomer, the functionalized copolymer including at least one functional group having silica reactive moieties, wherein the functionalized copolymer has a degree of hydrogenation of 75% to 98 mol % as measured using proton nuclear magnetic resonance spectroscopy ($^1$H NMR). In one or more embodiments, the silane modifier may include an oxygen-containing moiety, wherein the oxygen atom of the oxygen-containing moiety may not be directly bonded with the silicon atom.

11 Claims, 1 Drawing Sheet

(56) References Cited

FOREIGN PATENT DOCUMENTS

| | | | | |
|---|---|---|---|---|
| WO | WO-2006025098 | A1 | * | 3/2006 |
| WO | 2006078756 | A1 | | 7/2006 |
| WO | 2016127353 | A1 | | 8/2016 |
| WO | 2017047451 | A1 | | 9/2017 |
| WO | 2017014281 | A1 | | 5/2018 |

* cited by examiner

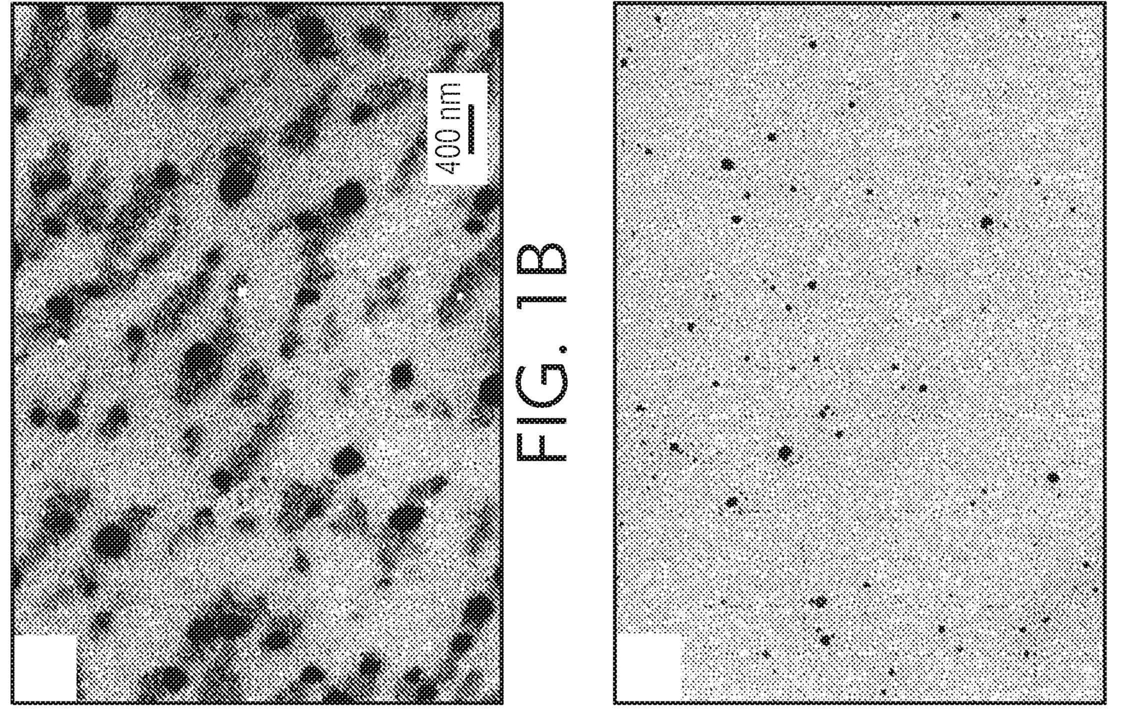
FIG. 1B
FIG. 1D
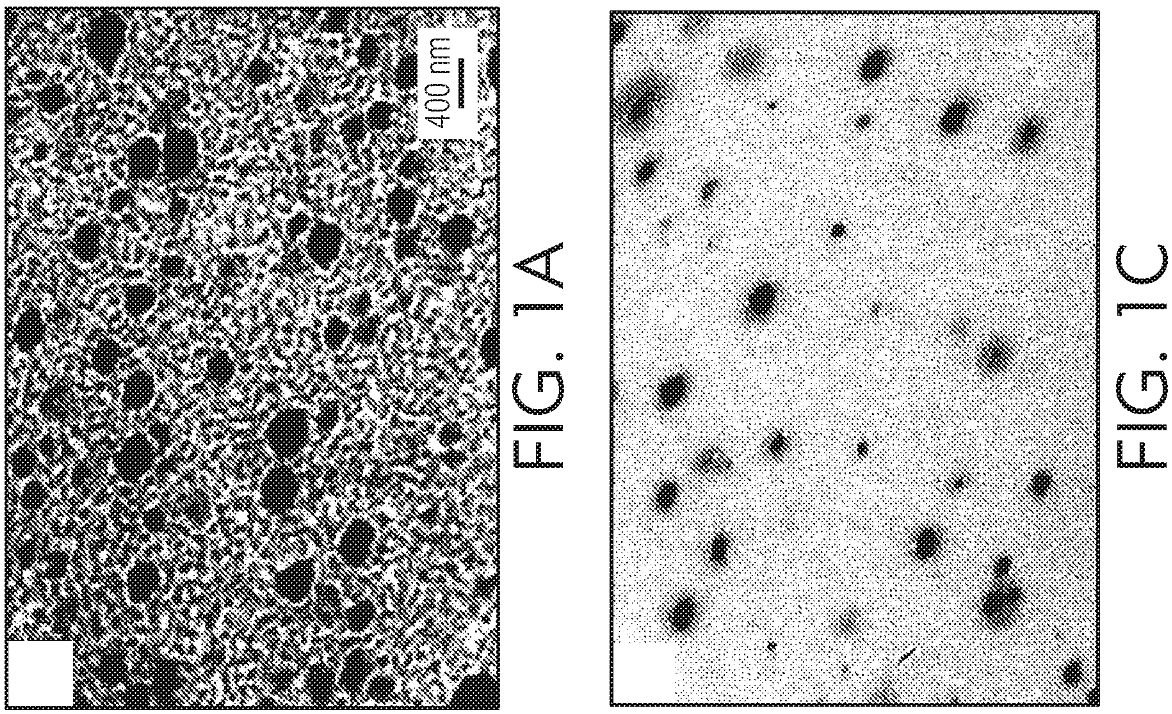
FIG. 1A
FIG. 1C

HIGH STRENGTH HYDROGENATED POLYMERS, AND RUBBER COMPOSITIONS INCORPORATING SAME

CROSS-REFERENCE TO RELATED APPLICATIONS

This application is a 35 U.S.C. § 371 national stage application of International Application No. PCT/US2019/038167, filed Jun. 20, 2019, which claims priority to U.S. Provisional Application No. 62/687,605, filed Jun. 20, 2018, which are both incorporated by reference herein in their entireties.

TECHNICAL FIELD

Embodiments of the present disclosure are generally related to hydrogenated copolymers, and are specifically related to hydrogenated, functionalized copolymers having improved mechanical strength.

BACKGROUND

Rubber tires employing tire treads have been used for more than a century. Because the tire tread provides the interface between the tire and the road surface, the tire tread performance correlates to the drivability of the vehicle. Accordingly, there is a continual need for improved rubber compositions which increase the performance of the tire treads.

SUMMARY

Embodiments of the present disclosure are directed to rubber compositions comprising hydrogenated functionalized copolymers, which provide improved mechanical strength, especially in tread tire applications. Specifically, these rubber compositions may demonstrate a significant improvement in elongation and tensile strength at break. By increasing the mechanical strength, these hydrogenated, functionalized copolymers may desirably enable a weight reduction in the tire, which reduces the rolling resistance of the tire. Moreover, while the present disclosure may focus on the utilization of the present rubber compositions in tire tread applications, the present compositions may also be suitable for tire sidewalls, inner liners and bladders, because the hydrogenated, functionalized copolymers have good ozone resistance properties (due to minimal double bonds) and good gas permeability (due to minimal solubility of gases within the polymer).

One embodiment of the present disclosure is directed to a hydrogenated functionalized copolymer produced by the steps of producing a living copolymer from the anionic polymerization of at least one conjugated diolefin monomer and at least one vinyl monomer, producing a functionalized copolymer by reacting the living copolymer with at least one silane modifier comprising an oxygen-containing moiety, and producing the hydrogenated functionalized copolymer by hydrogenating the functionalized copolymer in the presence of a hydrogenation catalyst. The oxygen atom of the oxygen-containing moiety may not be directly bonded with the silicon atom. The hydrogenated functionalized copolymer may have a degree of hydrogenation of 75% to 98 mol. % as measured using proton nuclear magnetic resonance spectroscopy ($^1$H NMR).

Another embodiment of the present disclosure is directed to a method of making a hydrogenated functionalized copolymer. The method may comprises the steps of introducing an anionic polymerization initiator, at least one conjugated diolefin monomer, at least one vinyl monomer, and solvent to a reactor to produce a living copolymer via anionic polymerization; reacting at least one silane modifier with the living copolymer to produce a functionalized copolymer; and hydrogenating the functionalized copolymer by mixing the functionalized copolymer with solvent and a hydrogenation catalyst in a hydrogen stream. The silane modifier may comprise an oxygen-containing moiety, and the oxygen atom of the oxygen-containing moiety may not be directly bonded with the silicon atom. The hydrogenated functionalized copolymer may have a degree of hydrogenation of 75% to 98 mol. % as measured using $^1$H NMR.

Additional features and advantages of the embodiments described herein will be set forth in the detailed description which follows, and in part will be readily apparent to those skilled in the art from that description or recognized by practicing the embodiments described herein, including the detailed description which follows, and the claims.

BRIEF DESCRIPTION OF THE DRAWINGS

FIG. 1A is a Transmission Electron Microscopy (TEM) micrograph of a styrene butadiene copolymer when hydrogenated to 45.73 mol % with respect to the butadiene (Table 1, Example 4, Sample 5) according to one or more embodiments of the present disclosure.

FIG. 1B is a TEM micrograph of a styrene butadiene copolymer when hydrogenated to 57.95 mol % (Table 1, Example 4, Sample 6) according to one or more embodiments of the present disclosure.

FIG. 1C is a TEM micrograph of a styrene butadiene copolymer when hydrogenated to 68.72 mol % (Table 1, Example 4, Sample 7) according to one or more embodiments of the present disclosure.

FIG. 1D is a TEM micrograph of a styrene butadiene copolymer when hydrogenated to 89.81 mol % (Table 1, Example 4, Sample 10) according to one or more embodiments of the present disclosure.

DETAILED DESCRIPTION

The present disclosure will now be described by reference to more detailed embodiments, but the disclosure should not be construed as limited to the embodiments set forth herein. Rather, these embodiments are provided so that this disclosure will be thorough and complete, and will fully convey the subject matter to those skilled in the art.

Unless otherwise defined, all technical and scientific terms used herein have the same meaning as commonly understood by one of ordinary skill in the art. The terminology used in the disclosure herein is for describing particular embodiments only and is not intended to be limiting. As used in the specification and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Definitions

The terminology as set forth herein is for description of the embodiments only and should not be construed as limiting the scope of the disclosure as a whole.

As used herein, the term "phr" means the parts by weight of rubber. If the rubber composition comprises more than one rubber, "phr" means the parts by weight per hundred parts of the sum of all rubbers.

As used herein, the term "polybutadiene" is used to indicate a polymer that is manufactured from 1,3-butadiene monomers. The term polybutadiene is also used interchangeably with the phrase "polybutadiene rubber" and the abbreviation "BR."

As used herein, the term "styrene-butadiene copolymer", "styrene-butadiene rubber" or "SBR" means a copolymer manufactured from styrene and 1,3-butadiene monomers.

As used herein, the term "natural rubber" or "NR" means naturally occurring rubber such as can be harvested from sources such as Hevea rubber trees, and non-Hevea source (e.g., guayule shrubs).

As used herein, the term "copolymer" refers to a polymer produced from two or more monomers, and thus could encompass polymers produced from two monomers or more than two monomers, such as terpolymers.

As used herein, "rubber composition" refers to the copolymer (e.g., the functionalized, hydrogenated copolymer) and the additional fillers and additives blended therewith for use in tire and non-tire applications.

As used herein, "vinyl content" refers to the percentage of 1,2-vinyl double bonds in the polymer (e.g., the functionalized, hydrogenated copolymer).

Embodiments of the present disclosure are directed to functionalized copolymers produced from the copolymerization of at least one conjugated diolefin monomer and at least one vinyl monomer. The functionalized copolymer comprises at least one functional group having silica reactive moieties, and the functionalized copolymer has a degree of hydrogenation of 75% to 98 mol % as measured using proton nuclear magnetic resonance spectroscopy ($^1$H NMR). Further embodiments are directed to rubber compositions comprising these functionalized, hydrogenated copolymers.

Additional embodiments are directed to methods of making the hydrogenated functionalized copolymers. The method comprises introducing an anionic polymerization initiator, at least one conjugated diolefin monomer, at least one vinyl aromatic monomer, and solvent to a reactor to produce a living copolymer via anionic polymerization; reacting at least one functional group comprising silica reactive moieties with the living copolymer to produce a functionalized copolymer; and hydrogenating the functionalized copolymer by mixing the functionalized copolymer with a solvent and a hydrogenation catalyst, wherein the hydrogenated functionalized copolymer has a degree of hydrogenation of at least 75 mol % as measured using $^1$H NMR.

Monomers

Various monomers are contemplated for the conjugated diolefin monomers and the vinyl monomers.

The conjugated diolefin monomers may include various hydrocarbon compositions. For example, the conjugated diolefins include those having from about 4 to about 12 carbon atoms such as 1,3-butadiene, 1,3-cyclohexadiene, isoprene, 1,3-pentadiene, 1,3-hexadiene, 2,3-dimethyl-1,3-butadiene, 2-ethyl-1,3-butadiene, 2-methyl-1,3 pentadiene, 3-methyl-1,3-pentadiene, 4-methyl-1,3-pentadiene, and 2,4-hexadiene, or combinations thereof. The conjugated diolefins also may encompass trienes such as myrcene.

The vinyl monomers may copolymerize with the conjugated diolefin monomers to produce a copolymer or terpolymers. The vinyl aromatic monomers may comprise hydrocarbons having from about 8 to about 20 carbon atoms, or from about 8 to 10 carbon atoms. These vinyl aromatic monomers may include vinyl aromatic monomers, for example, monovinyl aromatic hydrocarbons. In one or more embodiments, the vinyl monomers may comprise styrene, alpha-methyl styrene, 1-vinylnaphthalene, 2-vinylnaphthalene, 1-alpha-methylvinylnaphthalene, 2-alphamethyl-vinylnaphthalene, and mixtures of these as well as halo, alkoxy, alkyl, cycloalkyl, aryl, alkaryl and aralkyl derivatives thereof in which the total number of carbon atoms in the combined hydrocarbon is generally not greater than 12. Examples of these latter compounds include 4-methylstyrene, vinyl toluene, 3,5-diethylstyrene, 2-ethyl-4-benzylstyrene, 4-phenylstyrene, 4-para-tolylstyrene, and 4,5-dimethyl-1-vinylnaphthalene, or mixtures thereof.

The copolymers may comprise from 20 to 100% by weight, or about 40 to 80% by weight of the conjugated diolefin monomers. Conversely, the copolymers may comprise from 0 to about 80% by weight, or about 10 to about 50% by weight of vinyl aromatic monomers. The copolymers may be random copolymers or block copolymers. In one embodiment, the conjugated diolefin monomer is 1,3-butadiene and the vinyl aromatic monomer is styrene, which copolymerize to produce styrene butadiene copolymers. In specific embodiments, the copolymer is a random styrene butadiene copolymer.

Solvents

The polymerizations of the present disclosure may be conducted in the presence of solvent, for example, inert solvent. The term "inert solvent" means that the solvent does not enter into the structure of the resulting polymer, does not adversely affect the properties of the resulting polymer, and does not adversely affect the activity of the catalyst employed. Suitable inert solvents include hydrocarbon solvents which may contain aliphatic, aromatic or cycloaliphatic hydrocarbons such as hexane, pentane, toluene, benzene, cyclohexane and the like. Ethers such as tetrahydrofuran and tertiary amines such as triethylamine and tributylamine may also be used as solvents, but these may modify the polymerization as to styrene distribution, vinyl content and rate of reaction. In one or more embodiments, the solvents may comprise hexane, or blends and mixtures of hexanes (e.g., linear and branched), for example, cyclohexane alone or mixed with other forms of hexane.

Anionic Polymerization Initiator

Various anionic polymerization initiators are contemplated for the anionic polymerization processes of the present disclosure. The anionic polymerization initiator may comprises a lithium catalyst, specifically, an organolithium anionic initiator catalyst. The organolithium initiator employed may be any anionic organolithium initiators useful in the polymerization of conjugated diolefin monomers (e.g., 1,3-butadiene monomers). In general, the organolithium compounds include hydrocarbon containing lithium compounds of the formula R(Li)x wherein R represents hydrocarbon groups containing from one to about 20 carbon atoms, and preferably from about 2 to about 8 carbon atoms, and x is an integer from 1 to 2. Although the hydrocarbon group is preferably an aliphatic group, the hydrocarbon group may also be cycloaliphatic or aromatic. The aliphatic groups may be primary, secondary, or tertiary groups although the primary and secondary groups are preferred.

Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octa-decyl. The aliphatic groups may contain some unsaturation such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like. Mixtures of different lithium initiator compounds also can be employed such as those containing one or more lithium compounds such as R(Li)x, R and x as defined above. Other lithium catalysts which can be employed alone or in combination with the hydrocarbyl lithium initiators are tributyl tin lithium, lithium dialkyl amines, lithium dialkyl phosphines, lithium alkyl aryl phosphines and lithium diaryl phosphines. In one embodiment, the organolithium initiator is n-butyl lithium.

The amount of initiator required to effect the desired polymerization can be varied over a wide range depending upon a number of factors such as the desired polymer molecular weight, the desired 1,2- and 1,4-content of the conjugated diene, and the desired physical properties for the polymer produced. In general, the amount of initiator utilized may vary from as little as 0.2 millimole of lithium per 100 grams of monomers up to about 100 millimoles of lithium per 100 grams of monomers, depending upon the desired polymer molecular weight (typically 1,000 to 10,000,000 grams/mole average molecular weight).

Polymerization is begun by introducing the monomer(s) and solvent to a suitable reaction vessel, followed by the addition of the anionic polymerization initiators. The polymerization reaction may be carried out in a batch polymerization reactor system or a continuous polymerization reactor system. Polymerization conditions such as temperature, pressure and time are well known in the art for polymerizing the monomers as described with the anionic polymerization initiator as described. For example, for illustrative purposes only, the temperature employed in the polymerization is generally not critical and may range from about −60° C. to about 150° C. Exemplary polymerization temperatures may range from about 25° C. to about 130° C. for a polymerization time of a few minutes to up to 24 hours or more, and employing pressures generally sufficient to maintain polymerization admixtures substantially in the liquid phase, for example, at or near atmospheric pressure, depending on the temperature and other reaction parameters. The procedure may be carried out under anhydrous, anaerobic conditions. Polymerization of any of the above-identified monomers in the presence of an organolithium initiator results in the formation of a "living" polymer. The lithium proceeds to move down the growing chain as polymerization continues. Throughout formation or propagation of the polymer, the polymeric structure may be anionic and living. In other words, a carbon anion is present. A new batch of monomer subsequently added to the reaction can add to the living ends of the existing chains and increase the degree of polymerization. A living polymer or copolymer, therefore, may include a polymeric segment having an anionic reactive end.

Functional Groups

Functional groups may then be applied to the anionic reactive end of the living polymer to cap or terminate the living polymer. For the present functional copolymers, the functional groups may be silica-reactive, and optionally carbon black reactive. The silica-reactive moieties encompass one or more reactive groups that will react with silica reinforcing filler to form an ionic or covalent bond. While many of the functional groups focus on being reactive with silica, it is contemplated that the functional group could be reactive with both silica and carbon black. Useful functional groups that react with silica typically are electron donors or are capable of reacting with a proton. Exemplary groups include one or a combination of alkoxysilyl, hydroxyl, polyalkylene glycol, silanol, silyl halide, anhydride, organic acid, amines, heterocycles, and epoxy groups. Useful silica-reactive compounds containing one or more of these functional groups include functionalized elastomers, silica coupling agents, and silica-reactive dispersing aids.

In one or more embodiments, the functional group may be a silane modifier. Silane modifiers may include a silica atom bonded with hydrocarbon groups that may include heteroatoms (where the silica atom usually is bonded with four hydrocarbon groups). The hydrocarbon groups bonded to the silica may include cyclic moieties, and may be branched or straight-chained. For example, various alkoxysilyl compositions are contemplated, for example and not by way of limitation, alkoxysilane compounds, aralkyloxysilane compounds, tetraalkoxysilane compounds, alkylalkoxysilane compounds, alkenylalkoxysilane compounds, halogenoalkoxysilane compounds, or combinations therein. These may include one or more of dimethoxysilanes and trimethoxysilanes.

Examples of the tetraalkoxysilane compound may include tetramethoxysilane, tetraethoxysilane, tetra-n-propoxysilane, tetra-n-butoxysilane, tetra(2-ethylhexanoxy)silane, tetraphenoxysilane, tetratoluyloxysilane, and the like.

Examples of the alkylalkoxysilane may include methyltrimethoxysilane, methyltriethoxysilane, methyltri-n-propoxysilane, methyltri-n-butoxysilane, methyltriphenoxysilane, ethyltrimethoxysilane, ethyltriethoxysilane, ethyltri-n-propoxysilane, ethyltri-n-butoxysilane, ethyltriphenoxysilane, dimethyldimethoxysilane, dimethyldiethoxysilane, dimethyldi-n-propoxysilane, dimethyldi-n-butoxysilane, dimethyldiphenoxysilane, diethyldimethoxysilane, diphenyldimethoxysilane, 3-glycidoxypropyltrimethoxysilane (GPMOS), γ-methacryloxy propyl trimethoxysilane, and combinations thereof.

Examples of the arylalkoxysilane compound may include phenyltrimethoxysilane, phenyltriethoxysilane, phenyltri-n-propoxysilane, phenyltri-n-butoxysilane, phenyltriphenoxysilane, and combinations thereof.

Examples of the alkenylalkoxysilane compound may include vinyltrimethoxysilane, vinyltriethoxysilane, vinyltri-n-propoxysilane, vinyltri-n-butoxysilane, vinyltriphenoxysilane, allyltrimethoxysilane, octenyltrimethoxysilane, divinyldimethoxysilane, styryltrimethoxysilane, and combinations thereof.

Examples of the halogenoalkoxysilane compound may include trimethoxychlorosilane, triethoxychlorosilane, tri-n-propoxychlorosilane, tri-n-butoxychlorosilane, triphenoxychlorosilane, dimethoxydichlorosilane, diethoxydichlorosilane, di-n-propoxydichlorosilane, diphenoxydichlorosilane, methoxytrichlorosilane, ethoxytrichlorosilane, n-propoxytrichlorosilane, phenoxytrichlorosilane, trimethoxybromosilane, triethoxybromosilane, tri-n-propoxybromosilane, triphenoxybromosilane, dimethoxydibromosilane, diethoxydibromosilane, di-n-propoxydibromosilane, diphenoxydibromosilane, methoxytribromosilane, ethoxytribromosilane, n-propoxytribromosilane, phenoxytribromosilane, trimethoxyiodosilane, triethoxyiodosilane, tri-n-propoxyiodosilane, triphenoxyiodosilane, dimethoxydiiodosilane, di-n-propoxydiiodosilane, diphenoxydiiodosilane, methoxytriiodosilane, ethoxytriiodosilane, n-propoxytriiodosilane, phenoxytriiodosilane, and combinations thereof.

Additionally, the alkoxysilyl compositions may include trimethoxysilane compositions, such as 2-(3,4-epoxycyclohexyl)ethyltrimethoxysilane (ECETMOS), methyltrimethoxysilane ($MeSi(OMe)_3$), 3-glycidylpropyltrimethoxysilane, γ-glycidoxypropyltrimethoxysilane, or 3-(1,3-dimethylbutylidene)aminopropyltriethoxysilane. Additionally, the alkoxysilyl compositions may include tetraethylorthosilicate, 3-glycidylpropylmethyldimethoxysilane, or combinations thereof.

According to one or more embodiments, the silane modifier may comprise an oxygen-containing moiety where the oxygen atom of the oxygen-containing moiety may not be directly bonded with the silicon atom of the silane modifier. For example, the oxygen-containing moiety may be attached to the silicon atom of the silane modifier with a carbon molecule. It should be understood that in such embodiments, other moieties attached to the silica atom may be attached with an oxygen atom, such as an alkoxy group. However, at least one group (for example, of the four groups attached to the silica atom) may include an oxygen atom that is not directly bonded with the central silicon atom.

In additional embodiments presently described, the oxygen-containing moiety may include an oxygen heteroatom in a ring structure. For example, the oxygen-containing moiety may include a six-carbon ring structure with an oxygen atom bonded to any two carbons (sometimes adjacent carbons) in the six-carbon ring. The six-carbon ring may be attached to silicon atom of the silane modifier by, for example, an alkyl carbon chain.

According to further embodiments, the oxygen containing moiety may include an oxygen heteroatom that is a terminal oxygen atom. As presently described, a terminal atom may include an atom which is the furthest from the silicon molecule of the silane modifier (e.g., terminating a hydrocarbon chain) and additionally may include terminal molecules on side branches of a branched hydrocarbon moiety. The terminal atom may also include heteroatoms attached to or included in cyclic functionalities at the end of a hydrocarbon chain. For example, an oxygen-containing moiety attached to adjacent carbon molecules in a six-carbon cyclic moiety that terminates a carbon chain may be considered a terminal atom.

In additional embodiments, the silane modifier may be free of one or more of sulfur, phosphorous, or nitrogen. For example, in some embodiments, the silane modifier may be free of all sulfur, phosphorous, and nitrogen. In additional embodiments, the silane modifier may be free of any one or two of the sulfur, phosphorous, or nitrogen but include the third (in any combination).

In further embodiments, the functional group may comprise carbon black reactive moieties. The carbon reactive moieties may include amine functional groups. Various amines are contemplated, for example, primary amines (e.g., $NH_2$), secondary amines, or tertiary amines. Moreover, the amine functional groups may include aliphatic or aromatic moieties. In other embodiments, the functional group may comprise a tin compound to make the functional copolymer carbon-black reactive. Various tin compounds are contemplated, for example, monofunctional alkyl tin compounds including but not limited to, butyltin tris-(2-ethylhexanoate), butyltin chloride dihydroxide, butyltin hydroxide oxide hydrate, dibutyltin dilaurate, and dibutyltin dimaleate. Mixtures of monofunctional alkyl tin compounds may also be employed. Additionally, inorganic tin functional groups, such as tin tetrachloride ($SnCl_4$) are contemplated.

The polymerization conditions and reactants may dictate how much of the functional group is added. In one or more embodiments, the functional group may be present in a molar ratio (to initiator) of about 0.25 to 2, or about 0.5 to 1.

Additional Polymerization Ingredients

Additionally, in order to promote randomization in copolymerization and to control vinyl content, one or more polymeric modifiers may optionally be added to the polymerization ingredients. Amounts of polymeric modifier may range from 0 to about 90 or more equivalents per equivalent of initiator (e.g., lithium catalyst). Compounds useful as polymeric modifiers are typically organic and include those having an oxygen or nitrogen hetero-atom and a non-bonded pair of electrons. Examples include dialkyl ethers of mono and oligo alkylene glycols, "crown" ethers, tertiary amines such as tetramethyethylene diamine (TMEDA), tetrahydrofuran (THF), 2,2-bis(2'-tetrahydrofuryl)propane, THF oligomers linear and cyclic oligomeric oxolanyl alkanes (e.g., cyclic oligomeric oxolanyl propanes), potassium t-amylate (KTA), or combinations thereof.

The process of the present disclosure may optionally also include a stabilizing agent, for example, a silane stabilizing agent. One suitable silane stabilizing agent is octyltriethoxysilane. Moreover, an antioxidant such as 2,6-di-t-butyl-4-methylphenol (also called butylated hydoxytoluene (BHT)) may be added to reduce the likelihood of Mooney viscosity instability due to oxidative coupling. The stabilizing agent may be added to the reactor or another mixer downstream of the reactor. Similarly, the antioxidant may be added to the reactor or another mixer downstream of the reactor.

Optionally, upon termination, the functional terminated polymer may be quenched, if necessary, and dried. Quenching may be conducted by contacting the functional copolymer with a quenching agent for about 0.05 to about 2 hours at temperatures of from about 30° C. to about 120° C. to insure complete reaction. Suitable well known quenching agents include alcohols, water, carboxylic acids such 2-ethyl hexanoic acid (EHA), acetic acid and the like. Coagulation is typically done with alcohols such as methanol or isopropanol. Alternative to, or in combination with, the step of quenching, the functional polymer may be drum dried as known in the art. The use of steam or high heat to remove solvent is also considered suitable.

Hydrogenation

After production of the functionalized copolymer, the functional copolymer is hydrogenated by mixing the functionalized copolymer with a solvent and a hydrogenation catalyst in the presence of a hydrogen stream. The solvent may include one or more of the solvents described above. In one embodiment, the hydrogenation catalyst comprises nickel.

In further embodiments, the hydrogenation catalyst may comprise at least one nickel-containing composition, such as nickel octoate. In some embodiments, the hydrogenation catalyst may include comprise at least one nickel compound and at least one aluminum compound. In one or more embodiments, the nickel of the hydrogenation catalyst comprises an organic nickel compound such as a nickel carboxylane complex, such as nickel octoate. For hydrogenation catalysts including nickel and aluminum, the aluminum may also include an organic aluminum compound. Additional nickel-including compounds are contemplated for use in the hydrogenation catalyst such as, but not limited to, nickel alkoxides, nickel aryloxides, nickel halides, and nickel beta-diketonates. In one embodiment, the organic aluminum compound is triethylaluminum. The nickel and aluminum may be included in various amounts. For example, the aluminum and nickel may be added at an Al/Ni molar ratio of 1:1 to 5:1, or from 2:1 to 4:1.

According to additional embodiments, the hydrogenation catalyst may include one or more of Ruthenium (Ru), Rhodium (Rh), Palladium (Pd), Iridium (Ir), or Platinum (Pt). Various ligands including these contemplated catalytic materials are contemplated as hydrogenation catalysts. However, in some embodiments, the hydrogenation catalyst may be free of Titanium (Ti). Without being limited by any particular theory, it is believed that Ti may be undesirable as a hydrogenation catalyst when oxygen heteroatoms are present in the functional group that may react with the living polymer to produce a functionalized copolymer. For example, a functional group including a silane modifier comprising an oxygen heteroatom indirectly attached to the silicon of the silane may react with the Ti catalyst and inhibit hydrogenation, change the preferred chemistry of the functionalized copolymer, or both. It has been observed that hydrogenation catalysts which include nickel may provide superior catalytic performance when such functional groups are utilized. Additionally, other non-Ti based hydrogenation catalysts may provide enhanced functionality as compared with Ti based hydrogenation catalysts.

In the hydrogenation process, pressurized hydrogen may be added at a pressure from 1 to 100 atm. Like the above polymerization, additional components, such as the quenching agents and antioxidants, may be added to the reactor.

The following exemplary reaction depicted in Formula 1 below illustrates the hydrogenation of a styrene-butadiene copolymer.

Formula 1

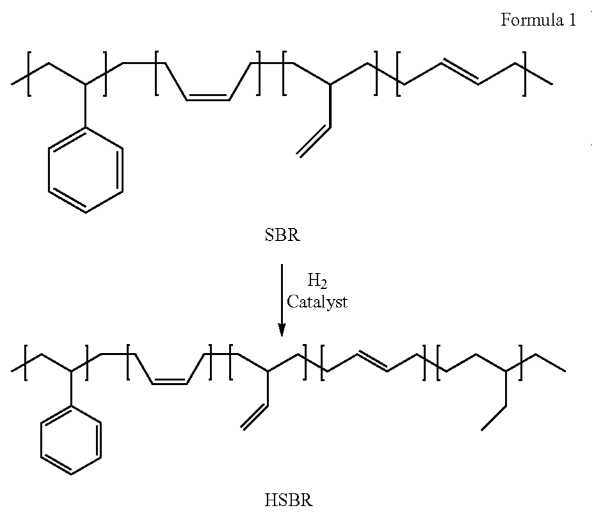

While not shown in Formula 1 above, the styrene butadiene copolymer may be functionalized with a functional group comprising silica reactive moieties prior to hydrogenation. In specific embodiments, the functional copolymer has a degree of hydrogenation of 75% to 98 mol % as measured using proton nuclear magnetic resonance spectroscopy ($^1H$ NMR), or from or from 80% to 98 mol %, or from 85% to 98 mol %, or from 90% to 98 mol %. Without being limited to theory, these higher levels of hydrogenation in the functional copolymer correlated to improved mechanical performance.

While the hydrogenation reduces the number of double bonds, the functional copolymer may, in one or more embodiments, have an initial vinyl content prior to hydrogenation from 10% to 60%, or from 30 to 60%. Without being bound by theory, controlling the initial vinyl content can maintain the amorphous nature of the functional copolymer, thereby reducing crystal formation that can degrade performance of the tire tread.

Rubber Compositions

As stated previously, the hydrogenated, functionalized copolymers detailed above, may be included in rubber compositions for tire and non-tire applications. The rubber composition may also include at least one curative, and at least one reinforcing filler.

Curative

As used herein, curatives are vulcanizing agents used in the vulcanization of the functionalized copolymer. In one or more embodiments, the curative includes a sulfur-based curative or a peroxide-based curative. Examples of specific suitable sulfur curatives include "rubbermaker's" soluble sulfur; sulfur donating curing agents, such as an amine disulfide, polymeric polysulfide, or sulfur olefin adducts; and insoluble polymeric sulfur. In one embodiment, the sulfur curative comprises soluble sulfur or a mixture of soluble and insoluble polymeric sulfur. For a general disclosure of suitable curatives and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. While various amounts are contemplated, the curatives may be used in an amount ranging from 0.1 to 10 phr, including from 1 to 7.5 phr, including from 1 to 5 phr, and preferably from 1 to 3.5 phr.

Reinforcing Filler

As used herein, "reinforcing filler" may refer particulate material that has a nitrogen absorption specific surface area ($N_2SA$) of more than about 100 $m^2/g$, and in certain instances more than 100 $m^2/g$, more than about 125 $m^2/g$, more than 125 $m^2/g$, or even more than about 150 $m^2/g$ or more than 150 $m^2/g$. Alternatively, "reinforcing filler" can also be used to refer to a particulate material that has a particle size of about 10 nm to about 50 nm.

In one or more embodiments, the reinforcing filler may comprise silica, carbon black, or combinations thereof.

Various carbon black compositions are considered suitable. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments, the rubber composition includes a mixture of two or more of the foregoing carbon blacks.

Various amounts of carbon black are contemplated. In one or more embodiments, the total amount of the reinforcing carbon black filler is 5 to about 175 phr, including 5 to 175 phr, about 5 to about 150 phr, 5 to 150 phr, about 5 to about 100 phr, 5 to 100 phr, or about 10 to about 200 phr, including 10 to 200 phr, about 20 to about 175 phr, 20 to 175 phr, about 20 to about 150 phr, 20 to 150 phr, about 25 to about 150 phr, 25 to 150 phr, about 25 to about 100 phr, 25 to 100 phr, about 30 to about 150 phr, 30 to 150 phr, about 30 to about 125 phr, 30 to 125 phr, about 30 to about 100 phr, 30 to 100 phr, about 35 to 150 phr, 35 to 150 phr, about 35 to about 125 phr, 35 to 125 phr, about 35 to about 100 phr, 35 to 100 phr, about 35 to about 80 phr, and 35 to 80 phr. The carbon blacks utilized can be in pelletized form or an unpelletized flocculent mass. For more uniform mixing in the rubber composition, unpelletized carbon black may be used in some embodiments.

Moreover, silica filler may also be used as reinforcing filler. Examples of reinforcing silica fillers suitable for use include, but are not limited to, precipitated amorphous silica, wet silica (hydrated silicic acid), dry silica (anhydrous silicic acid), fumed silica, calcium silicate and the like. Other suitable silica fillers for use in rubber compositions of certain embodiments of the first-third embodiments disclosed herein include, but are not limited to, aluminum silicate, magnesium silicate (e.g., $Mg_2SiO_4$, $MgSiO_3$), magnesium calcium silicate ($CaMgSiO_4$), aluminum calcium silicate (e.g., $Al_2O_3 \cdot CaO_2SiO_2$), and the like.

Like the carbon black, various amounts of silica are contemplated for use as reinforcing filler. In one or more embodiments, the total amount of the reinforcing silica filler or silica filler may be about 5 to about 175 phr, including 5 to 175 phr, about 5 to about 150 phr, 5 to 150 phr, about 5 to about 100 phr, 5 to 100 phr, or about 10 to about 200 phr, including 10 to 200 phr, about 20 to about 175 phr, 20 to 175 phr, about 20 to about 150 phr, 20 to 150 phr, about 25 to about 150 phr, 25 to 150 phr, about 25 to about 100 phr, 25 to 100 phr, about 30 to about 150 phr, 30 to 150 phr, about 30 to about 125 phr, 30 to 125 phr, about 30 to about 100 phr, 30 to 100 phr, about 35 to 150 phr, 35 to 150 phr, about 35 to about 125 phr, 35 to 125 phr, about 35 to about 100 phr, 35 to 100 phr, about 35 to about 80 phr, and 35 to 80 phr.

In other embodiments, the rubber composition may comprise at least one reinforcing filler other than carbon black or silica, or alternatively in addition to reinforcing carbon black and reinforcing silica fillers. Non-limiting examples of suitable such reinforcing fillers for use in the rubber compositions disclosed herein include, but are not limited to, aluminum hydroxide, talc, alumina ($Al_2O_3$), aluminum hydrate ($Al_2O_3H_2O$), aluminum hydroxide ($Al(OH)_3$), aluminum carbonate ($Al_2(CO_3)_2$), aluminum magnesium oxide ($MgOAl_2O_3$), pyrofilite ($Al_2O_34SiO_2 \cdot H_2O$), bentonite ($Al_2O_3 \cdot 4SiO_2 \cdot 2H_2O$), mica, kaolin, glass balloon, glass beads, calcium oxide (CaO), calcium hydroxide ($Ca(OH)_2$), calcium carbonate ($CaCO_3$), magnesium carbonate, magnesium hydroxide ($Mg(OH)_2$), magnesium oxide (MgO), magnesium carbonate ($MgCO_3$), potassium titanate, barium sulfate, zirconium oxide (ZrO2), zirconium hydroxide $[Zr(OH)_2 \cdot nH_2O]$, zirconium carbonate $[Zr(CO_3)_2]$, crystalline aluminosilicates, reinforcing grades of zinc oxide (i.e., reinforcing zinc oxide), and combinations thereof. When at least one reinforcing filler other than or alternatively in addition to reinforcing carbon black filler and reinforcing silica filler) is present, the total amount of all reinforcing fillers is about 5 to about 200 phr including 5 to 200 phr). In other words, when at least one reinforcing filler is present in addition to carbon black silica, or both, the amount of reinforcing carbon black filler and reinforcing silica filler is adjusted so that the total amount of reinforcing filler is about 5 to about 200 phr (including 5 to 200 phr).

Additional Rubber

In further embodiments, the rubber composition may comprise an additional rubber component comprising natural rubber, synthetic rubber, or combinations thereof. For example, and not by way of limitation, the synthetic rubber may comprise synthetic polyisoprene, polyisobutylene-co-isoprene, neoprene, poly(ethylene-co-propylene), poly(styrene-co-butadiene), poly(styrene-co-isoprene), and poly (styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, or combinations thereof.

Additional Additives

Optionally, a silane coupling agent may be blended with the silica reinforcing filler further improve the reinforcing properties. For example, the silane coupling agent may include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxy silane, 3-mercaptopropyltriethoxy silane, 2-mercaptoethyltrimethoxy silane, 2-mercaptoethyltriethoxy silane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyl dimethoxymethyl silane, dimethoxymethylsilylpropyl-N,N-dimethylthiocarbamoyl tetrasulfide, dimethoxymethylsilylpropyl benzothiazole tetrasulfide, 3-hexanoylthiopropyltriethoxysilane, 3-octanoylthiopropyltriethoxysilane, 3-decanoylthiopropyltriethoxysilane, 3-lauroylthiopropyltriethosysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane and 2-lauroylthioethyltrimethoxysilane, and the like. These silane coupling agents may be used alone or in a combination of two or more.

Useful processing or extender oils may also be included. Such oils include those that are commercially available as paraffinic, aromatic, or naphthenic oils. In one or more embodiments, the major constituent of the oil is naphthenic. The rubber compositions may also include other additives such as anti-ozonants, waxes, scorch inhibiting agents, processing aids, zinc oxide, tackifying resins, reinforcing resins, fatty acids such as stearic acid, peptizers, and one or accelerators.

The anti-ozonants may comprise N,N'disubstituted-p-phenylenediamines, such as N-1,3-dimethylbutyl-N'phenyl-p-phenylenediamine, N,N'-Bis(1,4-dimethylpently)-p-phenylenediamine, N-phenyl-N-isopropyl-p-phenylenediamine, and N-phenyl-N'-(1,3-dimethylbutyl)-p-phenylenediamine. Other examples of anti-ozonants include, Acetone diphenylamine condensation product, 2,4-Trimethyl-1,2-dihydroquinoline, Octylated Diphenylamine, and 2,6-di-t-butyl-4-methyl phenol.

The curing accelerators may include, but are not limited to, dithiocarbamate accelerators, including the metal dialkyldithiocarbamates such as, for example, zinc dibutyldithiocarbamate, zinc diethyldithiocarbamate, zinc dimethyldithiocarbamate, and ferric dimethyldithiocarbamate; thiazole accelerators including 2-mercaptobenzothiazole, the benzothiazole disulfides such as, for example, mercaptobenzothiazole disulfide; the benzothiazole sulfenamides, such as, for example, n-cyclohexyl-2-benzothiazole sulfenamide; and sulfenamide accelerators such as, for example, t-butyl-2-benzothiazyl sulfenamide.

The rubber compositions may include at least 3 parts by weight filler per 1000 parts rubber (phr), or about 5 to about 1000 phr, or about 20 to about 80 phr, or about 30 to about 50 phr. The rubber compositions may also include from about 0 to about 80 parts processing or extender oil per 100 parts by weight rubber, or from about 5 to about 50 phr, or from about 10 to about 30 phr.

Of the total hundred parts rubber, the functional copolymer may include from about 20 to about 100 parts of the 100 total, or about 25 to about 75 parts of the 100 total, 30 to about 60 parts of the 100 total.

The rubber composition may be obtained by milling with a milling machine such as rolls, an internal mixer or the like, which can be shaped and vulcanized for use in tire applications such as a tread, an under tread, a carcass, a sidewall, a bead and the like as well as a rubber cushion, a belt, a hose and other industrial products, but it is particularly suitable for use in the tire tread.

The embodiments of the present disclosure are further illustrated by reference to the following examples.

EXAMPLES

Example 1: Synthesis of SBR

A standard styrene-butadiene copolymer (SBR) was prepared according to the following process. To a two gallon (approximately 7.5 liter)$N_2$ purged reactor equipped with a stirrer was added 2.282 kilograms of hexane, 0.771 kilograms of 33.0 weight % styrene in hexane, and 3.698 kilograms of 20.7 weight % 1,3-butadiene in hexane. The reactor was charged with 5.32 milliliters of n-butyllithium (1.60 Molar in hexane), followed by 1.06 milliliters of 2,2-bis(2'-tetrahydrofuryl)propane (1.60 Molar in hexane), and the reactor jacket was heated to 50° C. After 35 minutes, the batch temperature peaked at 63.8° C. After an additional 30 minutes, the polymer cement was dropped into dried 28-oz glass bottles and the anionic polymerization reaction was terminated by adding 0.38 milliliters of isopropyl alcohol/hexane 1.0 M solution.

Referring to Table 1 below, the polymer microstructure of an initial SBR sample prior to hydrogenation can be seen in Table 1. Without being bound by theory, maintaining the amorphous nature of the rubber and reducing or eliminating crystallinity may be desirable. This amorphous nature may be maintained by ensuring the vinyl content is between 30-60%. At lower vinyl contents, polyethylene crystallites may begin to form and thereby detrimentally increase rolling resistance.

TABLE 1

| Standard SBR prior to hydrogenation | |
|---|---|
| | Example 1 |
| SBR Data | |
| % Styrene | 24.7 |
| % Block Styrene (≥3) | 7.1 |
| % 1,2 Bd (Vinyl Content) | 32.2 |
| % 1.4 Bd (Cis and Trans content) | 43.1 |
| $ML_{1+4}$ | 10.4 |
| T80 | 0.77 |
| GPC Data | |
| $M_n$ | 186,051 |
| $M_w$ | 198,959 |
| $M_p$ | 187,238 |
| $M_w/M_n$ | 1.07 |

Example 2: Synthesis of ECETMOS Functionalized SBR

ECETMOS [2-(3,4-epoxycyclohexyl)ethyltrimethoxysilane] functionalized styrene-butadiene copolymer (SBR) was prepared according to the following process. To a two gallon (approximately 7.5 liter) $N_2$ purged reactor equipped with a stirrer was added 2.282 kilograms of hexane, 0.771 kilograms of 33.0 weight % styrene in hexane, and 3.698 kilograms of 20.7 weight % 1,3-butadiene in hexane. The reactor was charged with 5.32 milliliters of n-butyllithium (1.60 Molar in hexane), followed by 1.06 milliliters of 2,2-bis(2'-tetrahydrofuryl)propane (1.60 Molar in hexane), and the reactor jacket was heated to 50° C. After 35 minutes, the batch temperature peaked at 63.8° C. After an additional 30 minutes, the polymer cement was dropped into dried 28-oz glass bottles and the anionic polymerization reaction was terminated by adding ECETMOS and 2.30 milliliters of isopropyl alcohol/hexane 0.165 M solution. Specifically, ECETMOS was added at 1 mole equivalent per 1 mole equivalent of LiBu. The SBR has a vinyl content of 32.2%.

Example 3: Synthesis of $MeSi(OMe)_3$ Functionalized SBR $MeSi(OMe)_3$ functionalized styrene-butadiene copolymer (SBR) was prepared according to the following process. To a two gallon (approximately 7.5 liter) $N_2$ purged reactor equipped with a stirrer was added 2.282 kilograms of hexane, 0.771 kilograms of 33.0 weight % styrene in hexane, and 3.698 kilograms of 20.7 weight % 1,3-butadiene in hexane. The reactor was charged with 5.32 milliliters of n-butyllithium (1.60 Molar in hexane), followed by 1.06 milliliters of 2,2-bis(2'-tetrahydrofuryl)propane (1.6 Molar in hexane), and the reactor jacket was heated to 50° C. After 35 minutes, the batch temperature peaked at 63.8° C. After an additional 30 minutes, the polymer cement was dropped into dried 28-oz glass bottles and the anionic polymerization reaction was terminated by adding $MeSi(OMe)_3$ and 0.38 milliliters of isopropyl alcohol/hexane 1.0 M solution. Specifically, $MeSi(OMe)_3$ was added at 1 mole equivalent per 1 mole equivalent of LiBu.

Example 4: Hydrogenation of SBR from Example 1

To a 2 gallon (approximately 8 liter) reactor under nitrogen atmosphere, 1,101 g of the Example 1 SBR solution in hexane was introduced, followed by 1,101 g of hexane, which resulted in a 7.5 wt % SBR solution. The reactor was purged 3 times with 20 psi hydrogen and then heated to 50° C. To a nitrogen purged dry bottle, 30 mL of hexane and 2.1 mL of 1.03 M triethylaluminum was added, followed by 0.73 mL of nickel octoate (5.96 wt % Ni in hexane), resulting in a Ni/Al catalyst (Al/Ni=3.3/1.0). The catalyst solution was transferred into the reactor, and hydrogen was immediately filled at a reactor pressure of 75 psi. An aliquot of reaction mixture was dropped into a bottle containing isopropanol, and 0.1 mL HCl and butylated hydroxytoluene (BHT). The coagulated polymer sample was dried under vacuum. The level of hydrogenation was then determined for various samples using $^{1}H$ NMR. As shown in Table 2 below, 13 samples of the Example 1 SBR were hydrogenated, and the resultant polymers (Example 4 Samples 1-12) had very similar glass transition temperatures (Tg) to the non-hydrogenated SBR (Example 1).

TABLE 2

Effect of hydrogenation content on the glass transition temperature (Tg)

| Example # | Hydrogenation Level (mol. %) | Tg (° C.) |
|---|---|---|
| Example 1 | 0 | −41.0 |
| Example 4, Sample 1 | 5.88 | −40.56 |
| Example 4, Sample 2 | 10.14 | −42.01 |
| Example 4, Sample 3 | 19.65 | −42.34 |
| Example 4, Sample 4 | 32.05 | −42.57 |
| Example 4, Sample 5 | 45.73 | −43.33 |
| Example 4, Sample 6 | 57.95 | −44.7 |
| Example 4, Sample 7 | 68.72 | −44.76 |
| Example 4, Sample 8 | 77.13 | −44.39 |
| Example 4, Sample 9 | 84.66 | −43.13 |
| Example 4, Sample 10 | 89.81 | −41.56 |
| Example 4, Sample 11 | 93.2 | −41.74 |
| Example 4, Sample 12 | 95.92 | −41.79 |

The above glass transition temperatures were measured using differential scanning calorimetry (DSC). No crystallinity was observed during the DSC testing for these samples of Table 2. Several of these partially hydrogenated samples were then imaged using transmission electron microscopy to determine the microphase separation as shown in the micrographs of FIGS. 1A-1D. The images were obtained by staining the remaining unsaturated double bonds with osmium tetroxide ($OsO_4$), which will cause the double bonds to appear darker in the image. In contrast to a standard SBR which has one single phase, these partially hydrogenated SBRs have very small length scale features on the order of 50 to 150 nm. As stated above, the heterogeneous hydrogenation leads to areas with high concentrations of double bonds and low concentrations of double bonds leads to heterogeneous crosslink density, which contributes to the improved mechanical properties.

Example 5: Hydrogenation of ECETMOS Functionalized SBR from Example 2

To a 2 gallon (approximately 8 liter) reactor under nitrogen atmosphere, 1,126 g of the Example 2 ECETMOS functionalized SBR solution in hexane was introduced, followed by 1,126 g of hexane, which resulted in a 7.5 wt % SBR solution. The reactor was purged 3 times with 20 psi hydrogen and then heated to 50° C. To a nitrogen purged dry bottle, 30 mL of hexane and 2.2 mL of 1.03 M triethylaluminum was added, followed by 0.74 mL of nickel octoate (5.96 wt % Ni in hexane), resulting in a Ni/Al catalyst (Al/Ni=3.3/1.0). The catalyst solution was transferred into the reactor, and hydrogen was immediately filled the reactor to 75 psi. After 2 hours of hydrogenation reaction, hydrogen was released from the reactor and the polymer cement was dropped into a bucket containing 8 L of isopropanol, 1 mL of HCl and 5 g of butylated hydroxytoluene (BHT). The coagulated polymer sample was dried by a drum-drier at 120° C. GPC and DSC data is provided in Table 2 below.

Example 6: Hydrogenation of $MeSi(OMe)_3$ Functionalized SBR from Example 3

To a 2 gallon (approximately 8 liter) reactor under nitrogen atmosphere, 1,154 g of the Example 2 $MeSi(OMe)_3$ functionalized SBR solution in hexane was introduced, followed by 1,154 g of hexane, which resulted in a 7.5 wt % SBR solution. The reactor was purged 3 times with 20 psi hydrogen and then heated to 50° C. To a nitrogen purged dry bottle, 30 mL of hexane and 2.2 mL of 1.03 M triethylaluminum was added, followed by 0.76 mL of nickel octoate (5.96 wt % Ni in hexane), resulting in a Ni/Al catalyst (Al/Ni=3.3/1.). The catalyst solution was transferred into the reactor, and hydrogen was immediately filled the reactor to 75 psi. After 2 hours of hydrogenation reaction, hydrogen was released from the reactor and the polymer cement was dropped into a bucket containing 8 L of isopropanol, 1 mL of HCl and 5 g of butylated hydroxytoluene (BHT). The coagulated polymer sample was dried by a drum-drier at 120° C. GPC and DSC data is provided in Table 3 below. percent of alkoxylsilane attached to the polymer backbone

TABLE 3

| Property | Example 5 | Example 6 |
|---|---|---|
| wt % Styrene | 24.2 | 24.2 |
| Hydrogenation level, mol % (Bd = 100) | 94.9 | 92.9 |
| GPC Data | | |
| Mn | 224,413 | 250,993 |
| Mw | 382,173 | 393,460 |
| Mp | 192,572 | 195,333 |
| Mw/Mn | 1.70 | 1.57 |
| DSC Data | | |
| Coupled, % | 29.7 | 49.0 |
| Tg, (° C.) | −42.99 | −42.30 |

Example 7. Production of Rubber and Testing

Referring to Table 4 below, rubber composition samples were produced from the above copolymers and evaluated using various metrics. While the specific amounts are listed below, the rubber compositions, which were produced from mixing in a Brabender mixer, include the following components: $SiO_2$, oil, stearic acid, wax, 1,3-dimethylbutyl-N'phenyl-p-phenylenediamine (6PPD), and silane, while the cure package includes ZnO, sulfur, n-tertiary butyl-2-benzothiazole sulfenamide (TBBS), diphenylguanidine (DPG), and mercaptobenzothiazole disulfide (MBTS).

TABLE 4

| Rubber Compositions Samples and Properties | | | | | | | | |
|---|---|---|---|---|---|---|---|---|
| Masterbatch Stage | Comp. Sample 1 | Comp. Sample 2 | Comp. Sample 3 | Comp. Sample 4 | Comp. Sample 5 | Sample 13 | Sample 14 | Sample 15 |
| Comparative SBR* | 100 | 100 | 100 | 100 | 100 | 0 | 0 | 0 |
| Example 6 Hydrogenated MeSi(OMe)3 Functionalized SBR | 0 | 0 | 0 | 0 | 0 | 100 | 0 | 0 |
| Example 5 Hydrogenated ECETMOS functionalized SBR | 0 | 0 | 0 | 0 | 0 | 0 | 100 | 0 |
| Example 4 Sample 12 Hydrogenated Non-functionalized SBR | 0 | 0 | 0 | 0 | 0 | 0 | 0 | 100 |
| $SiO_2$** | 55 | 45 | 65 | 55 | 55 | 55 | 55 | 55 |
| Oil, aliphatic | 10 | 10 | 10 | 10 | 10 | 10 | 10 | 10 |
| Stearic acid | 2 | 2 | 2 | 2 | 2 | 2 | 2 | 2 |
| (1,3-dimethylbutyl)-N'-phenyl-p-phenylenediamine (6PPD) | 1 | 1 | 1 | 1 | 1 | 1 | 1 | 1 |
| Silane | 3.2 | 3.2 | 3.2 | 3.2 | 3.2 | 3.2 | 3.2 | 3.2 |
| REMILL Stage | 171.2 | 171.2 | 171.2 | 171.2 | 171.2 | 171.2 | 171.2 | 171.2 |
| Zinc Oxide | 2.5 | 2.5 | 2.5 | 2.5 | 2.5 | 2.5 | 2.5 | 2.5 |
| Mercaptobenzothiazole disulfide (MBTS) | 0.7 | 0.7 | 0.7 | 0.7 | 0.7 | 0.7 | 0.7 | 0.7 |
| Diphenylguanidine (DPG) | 1.6 | 1.6 | 1.6 | 1.6 | 1.6 | 1.6 | 1.6 | 1.6 |
| N-Tertiary Butyl-2-Benzothiazole Sulfenamide (TBBS) | 1.5 | 1.5 | 1.5 | 1.5 | 1.5 | 1.5 | 1.5 | 1.5 |
| Sulfur | 1.65 | 1.65 | 1.65 | 1.65 | 1.65 | 1.65 | 1.65 | 1.65 |
| % Hydrogenation, mol % | 0 | 0 | 0 | 50 | 55.5 | 92.9 | 94.9 | 95 |
| Fracture Resistance (Normalized) | 100**** | 101 | 126 | 135 | 145 | 232 | 267 | 190 |
| Abrasion Resistance (Normalized) | 100**** | 97 | 86 | *** | *** | 108 | 117 | 91 |

*The Comparative SBR was obtained by solution polymerization and modified with Sn.

**The Silica is a high surface area silica with 190 $m^2/g$ surface area $N_2$ absorption.

*** Not measured

****Comparative Sample 1 is the control sample with an index of 100 for fracture resistance and abrasion resistance, which all other samples are compared.

As shown in Table 4 above, the normalized fracture resistance and normalized abrasion resistance of hydrogenated Samples 13-15 are compared to non-hydrogenated samples (Comparative Samples 1-3) and samples with lower hydrogenation levels (Comparative Samples 4 and 5). In this comparison, non-hydrogenated Comparative Sample 1 is the control sample with which all other samples in Table 4 are compared. As a result, Comparative Sample 1 has an index of 100 for fracture resistance and abrasion resistance. Samples having greater than 100 for normalized fracture resistance and/or normalized abrasion resistance are considered to demonstrate improvements over the control sample (Comparative Sample 1) for fracture resistance and/or normalized abrasion resistance. As shown, hydrogenated Samples 13-15 demonstrated much higher fracture resistance than non-hydrogenated Comparative Samples 1-3, and comparable abrasion resistance to Comparative Samples 1-3. Further, hydrogenated Samples 13-15 demonstrated much higher fracture resistance than Comparative Samples 4 and 5, which had lower hydrogenation levels. Moreover, hydrogenated Samples 13-15 demonstrated higher fracture resistance than Comparative Sample 3 despite the fact that Comparative Sample 3 contained more silica reinforcing filler than hydrogenated Samples 13-15.

Additionally, when comparing alkoxysilane functionalized hydrogenated Samples 13 and 14 against non-functionalized hydrogenated Sample 15, it is clear that the alkoxysilane functional groups also improved the fracture resistance and abrasion resistance of the rubber compositions. Consequently, the hydrogenation improves the fracture resistance of the rubber compositions, and the hydrogenation and alkoxysilane functionalization synergistically improves the fracture resistance of rubber compositions significantly more than hydrogenation alone. Moreover, alkoxysilane functionalized hydrogenated Samples 13 and 14 demonstrated improved abrasion resistance relative to non-functionalized hydrogenated Sample 15. This further demonstrates the improved strength properties yielded by the alkoxylsilane functional groups.

Example 8: Synthesis of SBR

A standard styrene-butadiene copolymer (SBR) was prepared according to the following process. To a five gallon (approximately 18.9 liter) $N_2$ purged reactor equipped with a stirrer was added 5.598 kilograms of hexane, 1.554 kilograms of 32.8 weight % styrene in hexane, and 5.778 kilograms of 20.6 weight % 1,3-butadiene in hexane. The reactor was charged with 2.39 milliliters of n-butyllithium (1.60 Molar in hexane), followed by 10.18 milliliters of tetramethylethylenediamine (68.03 mmol), and the reactor jacket was heated to 50° C. After 89 minutes, the batch temperature peaked at 53.8° C. After a total reaction time of 5 hours, the polymer cement was terminated and coagulated by dropping into three pails each containing 8 L of isopropanol and 15 g of 2,6-di-tert-butyl-4-methylphenol followed by drum-drying. Polymer characterization data is summarized in Table 5.

Example 9: Modification A of Example 8 Synthesis of SBR

A standard styrene-butadiene copolymer (SBR) was prepared according to the following process. To a five gallon (approximately 18.9 liter) $N_2$ purged reactor equipped with a stirrer was added 5.694 kilograms of hexane, 1.528 kilograms of 32.8 weight % styrene in hexane, and 5.709 kilograms of 21.0 weight % 1,3-butadiene in hexane. The reactor was charged with 3.15 milliliters of n-butyllithium (1.60 Molar in hexane), followed by 13.41 milliliters of tetramethylethylenediamine (89.60 mmol), and the reactor jacket was heated to 65.5° C. After 67 minutes, the batch temperature peaked at 74.2° C. After a total reaction time of 3 hours, the polymer cement was terminated and coagulated by dropping into three pails each containing 8 L of isopropanol and 15 g of 2,6-di-tert-butyl-4-methylphenol followed by drum-drying. Polymer characterization data is summarized in Table 5.

Example 10: Modification B of Example 8 Synthesis of SBR

A standard styrene-butadiene copolymer (SBR) was prepared according to the following process. To a five gallon (approximately 18.9 liter) $N_2$ purged reactor equipped with a stirrer was added 5.679 kilograms of hexane, 1.502 kilograms of 32.8 weight % styrene in hexane, and 5.749 kilograms of 21.0 weight % 1,3-butadiene in hexane. The reactor was charged with 3.32 milliliters of n-butyllithium (1.60 Molar in hexane), followed by 7.06 milliliters of tetramethylethylenediamine (47.16 mmol), and the reactor jacket was heated to 65.5° C. After 59 minutes, the batch temperature peaked at 75.6° C. After a total reaction time of 3 hours, the polymer cement was terminated and coagulated by dropping into three pails each containing 8 L of isopropanol and 15 g of 2,6-di-tert-butyl-4-methylphenol followed by drum-drying. Polymer characterization data is summarized in Table 5.

Example 11: Modification C of Example 8 Synthesis of SBR

A standard styrene-butadiene copolymer (SBR) was prepared according to the following process. To a five gallon (approximately 18.9 liter) $N_2$ purged reactor equipped with a stirrer was added 5.694 kilograms of hexane, 1.528 kilograms of 32.8 weight % styrene in hexane, and 5.709 kilograms of 21.0 weight % 1,3-butadiene in hexane. The reactor was charged with 3.15 milliliters of n-butyllithium (1.60 Molar in hexane), followed by 1.56 milliliters of tetramethylethylenediamine (10.4 mmol), and the reactor jacket was heated to 50° C. After 74 minutes, the batch temperature peaked at 57.9° C. After a total reaction time of 5 hours, the polymer cement was terminated and coagulated by dropping into three pails each containing 8 L of isopropanol and 15 g of 2,6-di-tert-butyl-4-methylphenol followed by drum-drying. Polymer characterization data is summarized in Table 5.

Example 12: Modification D of Example 8 Synthesis of SBR

A standard styrene-butadiene copolymer (SBR) was prepared according to the following process. To a five gallon (approximately 18.9 liter) $N_2$ purged reactor equipped with a stirrer was added 5.694 kilograms of hexane, 1.528 kilograms of 32.8 weight % styrene in hexane, and 5.709 kilograms of 21.0 weight % 1,3-butadiene in hexane. The reactor was charged with 3.15 milliliters of n-butyllithium (1.60 Molar in hexane), followed by 0.754 milliliters of tetramethylethylenediamine (5.04 mmol), and the reactor jacket was heated to 50° C. After 77 minutes, the batch temperature peaked at 58.3° C. After a total reaction time of 5 hours, the polymer cement was terminated and coagulated by dropping into three pails each containing 8 L of isopropanol and 15 g of 2,6-di-tert-butyl-4-methylphenol followed by drum-drying. Polymer characterization data is summarized in Table 5.

TABLE 5

| Examples 8-12 SBR Polymers | | | | | |
|---|---|---|---|---|---|
| SBR Data | Example 8 | Example 9 | Example 10 | Example 11 | Example 12 |
| mmol n-BuLi phgm | 0.225 | 17.78 | 0.312 | 0.296 | 0.296 |
| TMEDA/Li | 17.78 | 0.296 | 8.89 | 2 | 1 |
| Polymerization Temp | 50° C. | 65.5° C. | 65.5° C. | 50° C. | 50° C. |
| % Styrene | 30.9% | 30.8% | 30.5% | 30.0% | 29.8% |
| % Block Styrene (≥3) | 2.1% | 1.5% | 1.1% | 0.6% | 1% |
| % 1,2 Bd (Vinyl Content) | 62.6% | 60.3% | 59.3% | 57.8% | 48.4% |
| $ML_{1+4}$ | 86.89 | | | | |
| Tso | 12.97 | | | | |
| GPC Data | | | | | |
| $M_n$ | 416,855 | 394,470 | 358,691 | 428,636 | 420,191 |
| $M_w$ | 609,301 | 503,124 | 423,554 | 480,267 | 456,485 |
| $M_p$ | 618,621 | 531,162 | 426,588 | 446,889 | 427,755 |
| $M_w/M_n$ | 1.46 | 1.28 | 1.18 | 1.12 | 1.09 |
| DSC Data | | | | | |
| Tg(° C.) | −14.3 | −20* | −21* | −23* | −31* |

Example 13: Synthesis of APMDEOS Functionalized SBR for Ti Hydrogenation

APMDEOS functionalized styrene-butadiene copolymer (SBR) was prepared according to the following process. To a five gallon (approximately 18.9 liter) $N_2$ purged reactor equipped with a stirrer was added 5.680 kilograms of hexane, 1.555 kilograms of 32.8 weight % styrene in hexane, and 5.695 kilograms of 20.9 weight % 1,3-butadiene in hexane. The reactor was charged with 3.15 milliliters of n-butyllithium (1.60 Molar in hexane), followed by 0.754 milliliters of tetramethylethylenediamine (5.04 mmol), and the reactor jacket was heated to 50° C. After 77 minutes, the batch temperature peaked at 58.2° C. After a total reaction time of 5 hours, a sample of polymer cement was collected for characterization then 0.570 milliliters of APMDEOS (1.68 mmol) was charged to the reactor and the jacket temperature was reduced to 6.7° C. After stirring for 1 hour, a sample of polymer cement was collected for characterization and the remaining cement was transferred to another reactor for hydrogenation. Polymer characterization data of the non-hydrogenated functionalized SBR intermediate is summarized in Table 6.

Example 14: Synthesis of APMDEOS Functionalized SBR for Ni Hydrogenation

APMDEOS functionalized styrene-butadiene copolymer (SBR) was prepared according to the following process. To a five gallon (approximately 18.9 liter) $N_2$ purged reactor equipped with a stirrer was added 5.675 kilograms of hexane, 1.560 kilograms of 32.7 weight % styrene in hexane, and 5.695 kilograms of 20.9 weight % 1,3-butadiene in hexane. The reactor was charged with 3.15 milliliters of n-butyllithium (1.60 Molar in hexane), followed by 0.754 milliliters of tetramethylethylenediamine (5.04 mmol), and the reactor jacket was heated to 50° C. After 78 minutes, the batch temperature peaked at 58.2° C. After a total reaction time of 5 hours, a sample of polymer cement was collected for characterization then 0.570 milliliters of APMDEOS (1.68 mmol) was charged to the reactor and the jacket temperature was reduced to 5.6° C. After stirring for 1 hour, 0.42 milliliters of isopropyl alcohol (5.54 mmol) was added to the reactor to terminate the polymerization, a sample of polymer cement was collected for characterization, and the remaining cement was transferred to another reactor for hydrogenation. Polymer characterization data of the non-hydrogenated functionalized SBR intermediate is summarized in Table 6.

Example 15: Synthesis of ECETMOS Functionalized SBR for Ti Hydrogenation

ECETMOS [2-(3,4-epoxycyclohexyl)ethyltrimethoxysilane] functionalized styrene-butadiene copolymer (SBR) was prepared according to the following process. To a five gallon (approximately 18.9 liter) $N_2$ purged reactor equipped with a stirrer was added 5.680 kilograms of hexane, 1.555 kilograms of 32.8 weight % styrene in hexane, and 5.695 kilograms of 20.9 weight % 1,3-butadiene in hexane. The reactor was charged with 3.15 milliliters of n-butyllithium (1.60 Molar in hexane), followed by 0.754 milliliters of tetramethylethylenediamine (5.04 mmol), and the reactor jacket was heated to 50° C. After 78 minutes, the batch temperature peaked at 58.2° C. After a total reaction time of 5 hours, a sample of polymer cement was collected for characterization then 0.390 milliliters of ECETMOS (1.68 mmol) was charged to the reactor and the jacket temperature was reduced to 6.7° C. After stirring for 1 hour, a sample of polymer cement was collected for characterization and the remaining cement was transferred to another reactor for hydrogenation. Polymer characterization data of the non-hydrogenated functionalized SBR intermediate is summarized in Table 6.

Example 16: Synthesis of ECETMOS Functionalized SBR for Ni Hydrogenation

ECETMOS [2-(3,4-epoxycyclohexyl)ethyltrimethoxysilane] functionalized styrene-butadiene copolymer (SBR) was prepared according to the following process. To a five gallon (approximately 18.9 liter) $N_2$ purged reactor equipped with a stirrer was added 5.680 kilograms of hexane, 1.555 kilograms of 32.8 weight % styrene in hexane, and 5.695 kilograms of 20.9 weight % 1,3-butadiene in hexane. The reactor was charged with 3.15 milliliters of n-butyllithium (1.60 Molar in hexane), followed by 0.754 milliliters of tetramethylethylenediamine (5.04 mmol), and the reactor jacket was heated to 50° C. After 73 minutes, the batch temperature peaked at 58.4° C. After a total reaction time of 5 hours, a sample of polymer cement was collected for characterization then 0.390 milliliters of ECETMOS (1.68 mmol) was charged to the reactor and the jacket temperature was reduced to 6.7° C. After stirring for 1 hour, 0.42 milliliters of isopropyl alcohol (5.54 mmol) was added to the reactor to terminate the polymerization, a sample of polymer cement was collected for characterization and the remaining cement was transferred to another reactor for hydrogenation. Polymer characterization data of the non-hydrogenated functionalized SBR intermediate is summarized in Table 6.

TABLE 6

Synthesis of Functionalized SBRs for Hydrogenation

| | Example 13 | Example 14 | Example 15 | Example 16 |
|---|---|---|---|---|
| SBR Data | | | | |
| mmol n-BuLi phgm | 0.296 | 0.296 | 0.296 | 0.296 |
| TMEDA/Li | 1 | 1 | 1 | 1 |
| Polymerization Temp | 50° C. | 50° C. | 50° C. | 50° C. |
| % Styrene | 30.5% | 30.5% | 30.4% | 30.3% |
| % Block Styrene (≥3) | 1% | 1% | 0.8% | 3.2% |
| % 1,2 Bd (Vinyl Content) | 47.7% | 47.0% | 48.3% | 46.8% |
| GPC Data | | | | |
| Mn (Base) | 425,527 | 415,586 | 401,843 | 382,472 |
| $M_w$ (Base) | 501,176 | 492,808 | 440,437 | 427,984 |
| $M_p$ (Base) | 402,132 | 399,051 | 395,996 | 378,199 |
| $M_w/M_n$ (Base) | 1.18 | 1.19 | 1.10 | 1.12 |
| $M_n$ (Funct. Peak) | 415,867 | 394,717 | 969,770 | 909,720 |
| $M_w$ (Funct. Peak) | 486,489 | 456,663 | 1,122,514 | 1,070,460 |
| $M_p$ (Funct. Peak) | 395,996 | 381,103 | 952,590 | 889,035 |

TABLE 6-continued

| Synthesis of Functionalized SBRs for Hydrogenation | | | | |
|---|---|---|---|---|
| | Example 13 | Example 14 | Example 15 | Example 16 |
| $M_w/M_n$ (Funct. Peak) | 1.17 | 1.16 | 1.16 | 1.18 |
| % Coupled Peak | N/A | N/A | 85% | 82% |

Example 17: Ti Hydrogenation of APMDEOS Functionalized SBR from Example 13

To a 11.7 gallon (approximately 44.3 liter) stirred reactor under nitrogen atmosphere, 14,968 g of the Example 13 APMDEOS functionalized SBR solution in hexane was introduced, followed by 4,636 g of hexane, which resulted in a 8.5 wt % SBR solution. The reactor was charged with 30.86 milliliters of n-butyllithium (1.60 Molar in hexane), then was purged 3 times with 20 psi hydrogen, and finally pressured to 50 psi with hydrogen. After 15.8 hours, the reactor jacket was set to 90° C. To a nitrogen purged dry bottle, 1.35 g titanocene dichloride was added and suspended in 350 milliliters toluene. The catalyst solution was transferred into the reactor, and the reactor was immediately pressurized to 90 psi with hydrogen. After 4.5 hours of hydrogenation reaction, hydrogen flow was shut off to the reactor, and the jacket was set to 27° C. (full cooling). After the polymer cement had cooled to 60° C., hydrogen was released from the reactor and the polymer cement was transferred to a storage vessel. The polymer cement was then transferred into 4 buckets, each containing 6.3 L of isopropanol and 11.5 g of butylated hydroxytoluene (BHT). The coagulated polymer sample was dried by a drum-drier at 120° C. Hydrogenation data is provided in Table 7 below.

Example 18: Ni Hydrogenation of APMDEOS Functionalized SBR from Example 14

To a 11.7 gallon (approximately 44.3 liter) stirred reactor under nitrogen atmosphere, 14,968 g of the Example 14 APMDEOS functionalized SBR solution in hexane was introduced, followed by 4,636 g of hexane, which resulted in a 8.5 wt % SBR solution. The reactor was purged 3 times with 20 psi hydrogen and the reactor jacket was heated to 50° C. To a nitrogen purged dry bottle, 400 mL of hexane and 43.58 mL of 1.03 M triethylaluminum was added, followed by 7.91 mL of nickel octoate (10.1 wt % Ni in hexane), resulting in a Ni/Al catalyst (Al/Ni=3.3/1.0). The catalyst solution was transferred into the reactor, and the reactor was immediately pressurized to 75 psi with hydrogen. After 7.5 hours of hydrogenation reaction, hydrogen flow was shut off to the reactor. After an additional 13 hours, hydrogen was released from the reactor and the polymer cement was transferred to a storage vessel. The polymer cement was then transferred into 4 buckets, each containing 6.3 L of isopropanol and 11.5 g of butylated hydroxytoluene (BHT). The coagulated polymer sample was dried by a drum-drier at 120° C. Hydrogenation data is provided in Table 7 below.

Example 19: Ti Hydrogenation of ECETMOS Functionalized SBR from Example 15

To a 11.7 gallon (approximately 44.3 liter) stirred reactor under nitrogen atmosphere, 14,968 g of the Example 15 ECETMOS functionalized SBR solution in hexane was introduced, followed by 4,636 g of hexane, which resulted in a 8.5 wt % SBR solution. The reactor was charged with 98.89 milliliters of n-butyllithium (1.60 Molar in hexane), then was purged 3 times with 20 psi hydrogen, and finally pressured to 50 psi with hydrogen. After 15.5 hours, the reactor jacket was set to 90° C. To a nitrogen purged dry bottle, 4.06 g titanocene dichloride was added and suspended in 350 milliliters toluene. The catalyst solution was transferred into the reactor, and the reactor was immediately pressurized to 90 psi with hydrogen. After 4.5 hours of hydrogenation reaction, hydrogen flow was shut off to the reactor, and the jacket was set to 27° C. (full cooling). After the polymer cement had cooled to 44° C., hydrogen was released from the reactor and the polymer cement was transferred to a storage vessel. The polymer cement was then transferred into 4 buckets, each containing 6.3 L of isopropanol and 11.5 g of butylated hydroxytoluene (BHT). The coagulated polymer sample was dried by a drum-drier at 120° C. Hydrogenation data is provided in Table 7 below.

Example 20: Ni Hydrogenation of ECETMOS Functionalized SBR from Example 16

To a 11.7 gallon (approximately 44.3 liter) stirred reactor under nitrogen atmosphere, 14,968 g of the Example 16 ECETMOS functionalized SBR solution in hexane was introduced, followed by 4,636 g of hexane, which resulted in a 8.5 wt % SBR solution. The reactor was purged 3 times with 20 psi hydrogen and the reactor jacket was heated to 50° C. To a nitrogen purged dry bottle, 400 mL of hexane and 20.43 mL of 1.03 M triethylaluminum was added, followed by 3.71 mL of nickel octoate (10.1 wt % Ni in hexane), resulting in a Ni/Al catalyst (Al/Ni=3.3/1.0). The catalyst solution was transferred into the reactor, and the reactor was immediately pressurized to 75 psi with hydrogen. After 2.2 hours of hydrogenation reaction, an additional amount of catalyst, made as previously noted in this example, was added in an attempt to increase reaction rate. After an additional 5.5 hours of hydrogenation reaction, hydrogen flow was shut off to the reactor. After an additional 12.8 hours, hydrogen was released from the reactor and the polymer cement was transferred to a storage vessel. The polymer cement was then transferred into 4 buckets, each containing 6.3 L of isopropanol and 11.5 g of butylated hydroxytoluene (BHT). The coagulated polymer sample was dried by a drum-drier at 120° C. Hydrogenation data is provided in Table 7 below.

TABLE 7

| Hydrogenation of Functionalized SBRs | | | | |
|---|---|---|---|---|
| Hydrogenated SBR Data | Example 17 | Example 18 | Example 19 | Example 20 |
| mmol Ti phgm | 0.32 | N/A | 0.96 | N/A |
| Li:Ti | 10 | N/A | 10 | N/A |
| mmol Ni phgm | N/A | 0.80 | N/A | 0.76 |
| Al:Ni | N/A | 3.3 | N/A | 3.3 |
| Hydrogenation Temp | 90° C. | 50° C. | 90° C. | 50° C. |
| Hydrogenation Pressure | 90 psig | 75 psig | 90 psig | 75 psig |
| Hydrogenation Extent | 93.0% | 95.3% | 92.6% | 94.0% |

Example 21: Synthesis of SBR (Base Control Polymer)

A standard styrene-butadiene copolymer (SBR) was prepared according to the following process. To a five gallon (approximately 18.9 liter) $N_2$ purged reactor equipped with a stirrer was added 3.831 kilograms of hexane, 1.307 kilograms of 32.8 weight % styrene in hexane, and 6.242 kilograms of 20.6 weight % 1,3-butadiene in hexane. The reactor was charged with 5.72 milliliters of n-butyllithium (2.50 Molar in hexane), followed by 1.97 milliliters of 2,2-bis(2'-tetrahydrofuryl)propane (1.60 Molar in hexane), and the reactor jacket was heated to 50° C. After 43 minutes, the batch temperature peaked at 78.5° C. After an additional 60 minutes, the anionic polymerization reaction was terminated by adding 1.31 milliliters of isopropyl alcohol. After an additional 10 minutes, the batch was dropped into 4 buckets, each containing 6.3 L of isopropanol and 11.5 g of butylated hydroxytoluene (BHT). The coagulated polymer sample was dried by a drum-drier at 120° C. Polymer characterization data is summarized in Table 8.

Example 22: Synthesis of ECETMOS Functionalized SBR for Ni Hydrogenation

ECETMOS [2-(3,4-epoxycyclohexyl)ethyltrimethoxysilane] functionalized styrene-butadiene copolymer (SBR) was prepared according to the following process. To a five gallon (approximately 18.9 liter) $N_2$ purged reactor equipped with a stirrer was added 3.831 kilograms of hexane, 1.307 kilograms of 32.8 weight % styrene in hexane, and 6.242 kilograms of 20.6 weight % 1,3-butadiene in hexane. The reactor was charged with 5.72 milliliters of n-butyllithium (2.50 Molar in hexane), followed by 1.97 milliliters of 2,2-bis(2'-tetrahydrofuryl)propane (1.60 Molar in hexane), and the reactor jacket was heated to 50° C. After 39 minutes, the batch temperature peaked at 78.1° C. After an additional 40 minutes, the anionic polymerization reaction was terminated by adding 3.31 milliliters of ECETMOS. After an additional 30 minutes, 1.31 milliliters of isopropyl alcohol was added. After an additional 10 minutes, a sample of polymer cement was collected for characterization and the remaining cement was transferred to a storage vessel in preparation for transfer to a hydrogenation reactor. Polymer characterization data of the non-hydrogenated functionalized SBR intermediate is summarized in Table 8.

Example 23: Synthesis of ECETMOS Functionalized SBR for Ti Hydrogenation

ECETMOS [2-(3,4-epoxycyclohexyl)ethyltrimethoxysilane] functionalized styrene-butadiene copolymer (SBR) was prepared according to the following process. To a five gallon (approximately 18.9 liter) $N_2$ purged reactor equipped with a stirrer was added 3.913 kilograms of hexane, 1.315 kilograms of 32.6 weight % styrene in hexane, and 6.153 kilograms of 20.9 weight % 1,3-butadiene in hexane. The reactor was charged with 5.72 milliliters of n-butyllithium (2.50 Molar in hexane), followed by 1.97 milliliters of 2,2-bis(2'-tetrahydrofuryl)propane (1.60 Molar in hexane), and the reactor jacket was heated to 50° C. After 51 minutes, the batch temperature peaked at 68.0° C. After an additional 40 minutes, the anionic polymerization reaction was terminated by adding 3.31 milliliters of ECETMOS. After an additional 30 minutes, a sample of polymer cement was collected for characterization and the remaining cement was transferred to a storage vessel in preparation for transfer to a hydrogenation reactor. Polymer characterization data of the non-hydrogenated functionalized SBR intermediate is summarized in Table 8.

Example 24: Synthesis of APMDEOS Functionalized SBR for Ni Hydrogenation

APMDEOS functionalized styrene-butadiene copolymer (SBR) was prepared according to the following process. To a five gallon (approximately 18.9 liter) $N_2$ purged reactor equipped with a stirrer was added 3.832 kilograms of hexane, 1.306 kilograms of 32.8 weight % styrene in hexane, and 6.242 kilograms of 20.6 weight % 1,3-butadiene in hexane. The reactor was charged with 5.72 milliliters of n-butyllithium (2.50 Molar in hexane), followed by 1.97 milliliters of 2,2-bis(2'-tetrahydrofuryl)propane (1.60 Molar in hexane), and the reactor jacket was heated to 50° C. After 40 minutes, the batch temperature peaked at 77.2° C. After an additional 40 minutes, the anionic polymerization reaction was terminated by adding 4.88 milliliters of APMDEOS. After an additional 30 minutes, 1.31 milliliters of isopropyl alcohol was added. After an additional 10 minutes, a sample of polymer cement was collected for characterization and the remaining cement was transferred to a storage vessel in preparation for transfer to a hydrogenation reactor. Polymer characterization data of the non-hydrogenated functionalized SBR intermediate is summarized in Table 8.

Example 25: Synthesis of APMDEOS Functionalized SBR for Ti Hydrogenation

APMDEOS functionalized styrene-butadiene copolymer (SBR) was prepared according to the following process. To a five gallon (approximately 18.9 liter) $N_2$ purged reactor equipped with a stirrer was added 3.913 kilograms of hexane, 1.315 kilograms of 32.6 weight % styrene in hexane, and 6.153 kilograms of 20.9 weight % 1,3-butadiene in hexane. The reactor was charged with 5.72 milliliters of n-butyllithium (2.50 Molar in hexane), followed by 1.97 milliliters of 2,2-bis(2'-tetrahydrofuryl)propane (1.60 Molar in hexane), and the reactor jacket was heated to 50° C. After 48 minutes, the batch temperature peaked at 70.1° C. After an additional 40 minutes, the anionic polymerization reaction was terminated by adding 4.88 milliliters of APMDEOS. After an additional 30 minutes, a sample of polymer cement was collected for characterization and the remaining cement was transferred to a storage vessel in preparation for transfer to a hydrogenation reactor. Polymer characterization data of the non-hydrogenated functionalized SBR intermediate is summarized in Table 8.

TABLE 8

Synthesis of Base Control SBR and Functionalized SBRs for Hydrogenation

| | Example 21 | Example 22 | Example 23 | Example 24 | Example 25 |
|---|---|---|---|---|---|
| SBR Data | | | | | |
| mmol n-BuLi phgm | 0.833 | 0.833 | 0.833 | 0.833 | 0.833 |
| OOPS/Li | 0.22 | 0.22 | 0.22 | 0.22 | 0.22 |
| Polymerization Temp | 50° C. | 50° C. | 50° C. | 50° C. | 50° C. |
| % Styrene | 24.8% | 25.4% | 25.6% | 25.5% | 25.4% |
| % 1,2 Bd (Vinyl Content) | 38.6% | 39.8% | 44.2% | 38.8% | 41.0% |
| GPC Data | | | | | |
| Mn (Base) | 178,526 | 180,036 | 159,494 | 171,713 | 158,289 |
| $M_w$ (Base) | 186,040 | 186,857 | 165,393 | 178,577 | 164,447 |
| $M_p$ (Base) | 183,616 | 186,320 | 165,820 | 178,327 | 164,610 |
| $M_w/M_n$ (Base) | 1.042 | 1.038 | 1.037 | 1.040 | 1.039 |
| $M_n$ (Funct. Peak) | N/A | 410,617 | 375,003 | | |
| $M_w$ (Funct. Peak) | N/A | 457,054 | 427,569 | | |
| $M_p$ (Funct. Peak) | N/A | 368,763 | 327,393 | | |
| $M_w/M_n$ (Funct. Peak) | N/A | 1.113 | 1.140 | | |
| % Coupled Peak | N/A | 53.4% | 51.9% | N/A | N/A |

jacket was set to 90° C. To a nitrogen purged dry bottle, 4.01 g titanocene dichloride was added and suspended in 350 milliliters toluene. The catalyst solution was transferred into the reactor, and the reactor was immediately pressurized to 90 psi with hydrogen. After 2.5 hours of hydrogenation reaction, hydrogen flow was shut off to the reactor, and the jacket was set to 27° C. (full cooling). After the polymer cement had cooled to 59° C., hydrogen was released from the reactor and the polymer cement was transferred to a storage vessel. The polymer cement was then transferred into 4 buckets, each containing 6.3 L of isopropanol and 11.5 g of butylated hydroxytoluene (BHT). The coagulated polymer sample was dried by a drum-drier at 120° C. Hydrogenation data is provided in Table 9 below.

Example 26: Ni Hydrogenation of ECETMOS Functionalized SBR from Example 22

To a 11.7 gallon (approximately 44.3 liter) stirred reactor under nitrogen atmosphere, 11,430 g of the Example 22 ECETMOS functionalized SBR solution in hexane was introduced, followed by 5,315 g of hexane, which resulted in a 10.0 wt % SBR solution. The reactor was purged 3 times with 20 psi hydrogen and the reactor jacket was heated to 50° C. To a nitrogen purged dry bottle, 400 mL of hexane and 21.97 mL of 1.03 M triethylaluminum was added, followed by 3.99 mL of nickel octoate (10.1 wt % Ni in hexane), resulting in a Ni/Al catalyst (Al/Ni=3.3/1.0). The catalyst solution was transferred into the reactor, and the reactor was immediately pressurized to 75 psi with hydrogen. After 1.5 hours of hydrogenation reaction, hydrogen was released from the reactor and the polymer cement was transferred to a storage vessel. The polymer cement was then transferred into 4 buckets, each containing 6.3 L of isopropanol and 11.5 g of butylated hydroxytoluene (BHT). The coagulated polymer sample was dried by a drum-drier at 120° C. Hydrogenation data is provided in Table 9 below.

Example 27: Ti Hydrogenation of ECETMOS Functionalized SBR from Example 23

To a 11.7 gallon (approximately 44.3 liter) stirred reactor under nitrogen atmosphere, 11,430 g of the Example 23 ECETMOS functionalized SBR solution in hexane was introduced, followed by 5,315 g of hexane, which resulted in a 10.0 wt % SBR solution. The reactor was charged with 93.94 milliliters of n-butyllithium (1.60 Molar in hexane), then was purged 3 times with 20 psi hydrogen, and finally pressured to 40 psi with hydrogen. After 2 hours, the reactor

Example 28: Ni Hydrogenation of APMDEOS Functionalized SBR from Example 24

To a 11.7 gallon (approximately 44.3 liter) stirred reactor under nitrogen atmosphere, 11,430 g of the Example 24 APMDEOS functionalized SBR solution in hexane was introduced, followed by 5,315 g of hexane, which resulted in a 10.0 wt % SBR solution. The reactor was purged 3 times with 20 psi hydrogen and the reactor jacket was heated to 50° C. To a nitrogen purged dry bottle, 400 mL of hexane and 21.97 mL of 1.03 M triethylaluminum was added, followed by 3.99 mL of nickel octoate (10.1 wt % Ni in hexane), resulting in a Ni/Al catalyst (Al/Ni=3.3/1.0). The catalyst solution was transferred into the reactor, and the reactor was immediately pressurized to 75 psi with hydrogen. After 1.7 hours of hydrogenation reaction, hydrogen was released from the reactor and the polymer cement was transferred to a storage vessel. The polymer cement was then transferred into 4 buckets, each containing 6.3 L of isopropanol and 11.5 g of butylated hydroxytoluene (BHT). The coagulated polymer sample was dried by a drum-drier at 120° C. Hydrogenation data is provided in Table 9 below.

Example 29: Ti Hydrogenation of APMDEOS Functionalized SBR from Example 25

To a 11.7 gallon (approximately 44.3 liter) stirred reactor under nitrogen atmosphere, 11,430 g of the Example 25 APMDEOS functionalized SBR solution in hexane was introduced, followed by 5,315 g of hexane, which resulted in a 10.0 wt % SBR solution. The reactor was charged with 31.21 milliliters of n-butyllithium (1.30 Molar in hexane), then was purged 3 times with 20 psi hydrogen, and finally pressured to 60 psi with hydrogen. After 2.8 hours, the reactor jacket was set to 90° C. To a nitrogen purged dry bottle, 1.37 g titanocene dichloride was added and suspended in 350 milliliters toluene. The catalyst solution was transferred into the reactor, and the reactor was immediately pressurized to 90 psi with hydrogen. After 5 hours of hydrogenation reaction, hydrogen flow was shut off to the reactor, and the jacket was set to 27° C. (full cooling). After the polymer cement had cooled to 41° C., hydrogen was released from the reactor and the polymer cement was transferred to a storage vessel. The polymer cement was then transferred into 4 buckets, each containing 6.3 L of isopropanol and 11.5 g of butylated hydroxytoluene (BHT). The coagulated polymer sample was dried by a drum-drier at 120° C. Hydrogenation data is provided in Table 9 below.

Example 30: Attempted Ti Hydrogenation of ECETMOS Functionalized SBR

To a 11.7 gallon (approximately 44.3 liter) stirred reactor under nitrogen atmosphere, 11,430 g of a functionalized polymer cement produced in the manner of Example 23 was introduced, followed by 5,315 g of hexane, which resulted in a 10.0 wt % SBR solution. The reactor was charged with 28.98 milliliters of n-butyllithium (1.40 Molar in hexane), then was purged 3 times with 20 psi hydrogen, and finally pressured to 22 psi with hydrogen. After 2 hours, the reactor jacket was set to 90° C. To a nitrogen purged dry bottle, 1.37 g titanocene dichloride was added and suspended in 350 milliliters toluene. The catalyst solution was transferred into the reactor, and the reactor was immediately pressurized to 90 psi with hydrogen. After 10 minutes, hydrogen flow to the reactor became very slow (below 0.01 standard cubic feet per minute, the lowest measurable flow), indicating a very slow or stopped hydrogenation reaction. The reaction was allowed to continue for 1.6 hours, at which point the hydrogen flow was completely stopped and the jacket was set to 27° C. (full cooling). After the polymer cement had cooled to 29° C., hydrogen was released from the reactor and the polymer cement was transferred to a storage vessel. The polymer cement was then transferred into 4 buckets, each containing 6.3 L of isopropanol and 11.5 g of butylated hydroxytoluene (BHT). The coagulated polymer sample was dried by a drum-drier at 120° C. Hydrogenation data is provided in Table 9 below.

TABLE 9

| Hydrogenation of Functionalized SBRs | | | | | |
|---|---|---|---|---|---|
| Hydrogenated SBR Data | Example 26 | Example 27 | Example 28 | Example 29 | Example 30 |
| mmol Ti phgm | N/A | 0.96 | N/A | 0.32 | 0.32 |
| Li:Ti | N/A | 10 | N/A | 10 | 10 |
| mmol Ni phgm | 0.40 | N/A | 0.40 | N/A | N/A |
| Al:Ni | 3.3 | N/A | 3.3 | N/A | N/A |
| Hydrogenation Temp | 50° C. | 90° C. | 50° C. | 90° C. | 90° C. |
| Hydrogenation Pressure | 75 psig | 90 psig | 75 psig | 90 psig | 90 psig |
| Hydrogenation Extent | 95.2% | 96.6% | 96.4% | 96.8% | 6.4% |

Example 31: Production of Rubber and Testing

Referring to Table 10 below, rubber composition samples were produced from the above copolymers and evaluated using various metrics. While the specific amounts are listed below, the rubber compositions, which were produced from mixing in a Brabender mixer.

TABLE 10

| Rubber Compositions Samples | | | | | |
|---|---|---|---|---|---|
| | Comp. Sample 6 | Sample 16 | Sample 17 | Sample 18 | Sample 19 |
| Masterbatch Stage | | | | | |
| Example 12 polymer (non-hydrogenated) | 100 | 0 | 0 | 0 | 0 |
| Example 17 polymer | 0 | 100 | 0 | 0 | 0 |
| Example 18 polymer | 0 | 0 | 100 | 0 | 0 |
| Example 19 polymer | 0 | 0 | 0 | 100 | 0 |
| Example 20 polymer | 0 | 0 | 0 | 0 | 100 |
| $SiO_2$ ($N_2SA$ = 180 $m^2/g$) | 75 | 75 | 75 | 75 | 75 |
| Carbon black (N339) | 5 | 5 | 5 | 5 | 5 |
| Oil (X-140) | 25 | 25 | 25 | 25 | 25 |
| Stearic acid | 2 | 2 | 2 | 2 | 2 |
| Antioxidant | 1.5 | 1.5 | 1.5 | 1.5 | 1.5 |
| Silane (Si69) | 6 | 6 | 6 | 6 | 6 |
| Wax | 1 | 1 | 1 | 1 | 1 |
| Zinc Oxide | 2.5 | 2.5 | 2.5 | 2.5 | 2.5 |
| Final Stage | | | | | |
| CBS | 1.8 | 1.8 | 1.8 | 1.8 | 1.8 |
| DPG | 1.2 | 1.2 | 1.2 | 1.2 | 1.2 |
| Sulfur | 2 | 2 | 2 | 2 | 2 |

TABLE 11

| Rubber Composition Samples | | | | | |
|---|---|---|---|---|---|
| | Comp. Sample 7 | Sample 20 | Sample 21 | Sample 22 | Sample 23 |
| Masterbatch Stage | | | | | |
| Example 21 Polymer | 100 | 0 | 0 | 0 | 0 |
| Example 26 Polymer | 0 | 100 | 0 | 0 | 0 |
| Example 27 Polymer | 0 | 0 | 100 | 0 | 0 |
| Example 28 Polymer | 0 | 0 | 0 | 100 | 0 |
| Example 29 Polymer | 0 | 0 | 0 | 0 | 100 |
| $SiO_2$** | 55 | 55 | 55 | 55 | 55 |
| Oil, aliphatic | 10 | 10 | 10 | 10 | 10 |
| Stearic acid | 2 | 2 | 2 | 2 | 2 |

TABLE 11-continued

| Rubber Composition Samples | | | | | |
|---|---|---|---|---|---|
| | Comp. Sample 7 | Sample 20 | Sample 21 | Sample 22 | Sample 23 |
| 6PPD | 1 | 1 | 1 | 1 | 1 |
| Silane | 3.2 | 3.2 | 3.2 | 3.2 | 3.2 |
| Remill Stage | 171.2 | 171.2 | 171.2 | 171.2 | 171.2 |
| Final Stage | | | | | |
| Zinc Oxide | 2.5 | 2.5 | 2.5 | 2.5 | 2.5 |
| MBTS | 0.7 | 0.7 | 0.7 | 0.7 | 0.7 |
| DPG | 1.6 | 1.6 | 1.6 | 1.6 | 1.6 |
| TBBS | 1.5 | 1.5 | 1.5 | 1.5 | 1.5 |
| Sulfur | 1.65 | 1.65 | 1.65 | 1.65 | 1.65 |

The rubber samples of Tables 11 and 12 were evaluated for tensile properties, as shown in Tables 12 and 13, respectively. Additionally, a rubber composition prepared by the same conditions and with the same components was made using a "Base SBR" which was obtained by solution polymerization and modified with Sn. The tensile properties are standardized based on Comparative Samples 6 and 7, respectively.

As is observed from the data of Tables 12 and 13, for polymers with ECETMOS functionality, rubber prepared by hydrogenating the SBR with nickel hydrogenation catalyst (such as in Sample 16) showed superior tensile properties to that of rubber prepared by titanium hydrogenation catalyst (such as Sample 17). For example, greater Th was observed for Sample 16 than Sample 17. However, when APMDEOS was the functional group, the catalyst did not appear to significantly affect Tb.

TABLE 12

| Rubber Sample Properties | | | | | | |
|---|---|---|---|---|---|---|
| Property | Comp. Sample 6 (based on polymer of Ex. 12) | Sample 16 (based on polymer of Ex. 17) | Sample 17 (based on polymer of Ex. 18) | Sample 18 (based on polymer of Ex. 19) | Sample 19 (based on polymer of Ex. 20) | Rubber including Base SBR |
| Tb (r.t.) (no aging) | 100 | 139 | 135 | 158 | 167 | 102 |
| Eb (r.t.) (no aging) | 100 | 222 | 234 | 212 | 218 | 133 |
| TbEb (no aging) | 100 | 309 | 316 | 334 | 364 | 135 |
| Tb (r.t.) (aged 100° C. for 1 day) | 96 | 143 | 138 | 148 | 164 | 99 |
| Eb (r.t.) (aged 100° C. for 1 day) | 82 | 187 | 195 | 155 | 185 | 110 |
| TbEb (aged 100° C. for 1 day) | 79 | 268 | 270 | 230 | 303 | 109 |
| TbEb retention rate (aged 80° C. for 7 days) | 79 | 87 | 85 | 69 | 83 | 81 |
| Tb (r.t.) (aged 80° C. for 7 days) | 80 | 140 | 135 | 163 | 162 | 99 |
| Eb (r.t.) (aged 80° C. for 7 days) | 72 | 176 | 190 | 164 | 177 | 107 |
| TbEb (aged 80° C. for 7 days) | 58 | 246 | 257 | 267 | 286 | 106 |
| TbEb retention rate (aged 80° C. for 7 days) | 58 | 80 | 81 | 80 | 79 | 78 |

TABLE 13

| Rubber Sample Properties | | | | | | |
|---|---|---|---|---|---|---|
| Property | Comp. Sample 7 (based on polymer of Ex. 21) | Sample 20 (based on polymer of Ex. 26) | Sample 21 (based on polymer of Ex. 27 | Sample 22 (based on polymer of Ex. 28 | Sample 23 (based on polymer of Ex. 29 | Rubber including Base SBR |
| Tb (r.t.) (no aging) | 100 | 291 | 176 | 288 | 276 | 105 |
| Eb (r.t.) (no aging) | 100 | 184 | 261 | 188 | 194 | 112 |
| TbEb (no aging) | 100 | 534 | 459 | 541 | 534 | 118 |
| Tb (r.t.) (aged 100° C. for 1 day) | 102 | 305 | 200 | 292 | 272 | 98 |
| Eb (r.t.) (aged 100° C. for 1 day) | 93 | 164 | 229 | 167 | 173 | 91 |
| TbEb (aged 100° C. for 1 day) | 95 | 501 | 458 | 489 | 470 | 89 |
| TbEb retention rate (aged 80° C. for 7 days) | 95 | 94 | 100 | 90 | 88 | 76 |
| Tb (r.t.) (aged 80° C. for 7 days) | 103 | 280 | 213 | 288 | 298 | 95 |
| Eb (r.t.) (aged 80° C. for 7 days) | 91 | 154 | 219 | 161 | 181 | 82 |

TABLE 13-continued

| Rubber Sample Properties | | | | | | |
|---|---|---|---|---|---|---|
| Property | Comp. Sample 7 (based on polymer of Ex. 21) | Sample 20 (based on polymer of Ex. 26) | Sample 21 (based on polymer of Ex. 27 | Sample 22 (based on polymer of Ex. 28 | Sample 23 (based on polymer of Ex. 29 | Rubber including Base SBR |
| TbEb (aged 80° C. for 7 days) | 94 | 431 | 465 | 463 | 538 | 78 |
| TbEb retention rate (aged 80° C. for 7 days) | 94 | 81 | 101 | 86 | 101 | 66 |

TESTING METHODS

Mooney Viscosity

The Mooney viscosities of polymers disclosed herein were determined at 100° C. using an Alpha Technologies Mooney viscometer with a large rotor, a one minute warm-up time, and a four minute running time. More specifically, the Mooney viscosity was measured by preheating each polymer to 100° C. for one minute before the rotor starts. The Mooney viscosity was recorded for each sample as the torque at four minutes after the rotor started. Torque relaxation was recorded after completing the four minutes of measurement. The $t_{80}$ values represent the time required for decaying 80% of the torque of each polymer.

Gel Permeation Chromatography (GPC)

The molecular weight ($M_n$, $M_w$ and $M_p$-peak $M_n$ of GPC curve) and molecular weight distribution ($M_w/M_n$) of the polymers were determined by GPC. The GPC measurements disclosed herein are calibrated with polystyrene standards and Mark-Houwink constants for the polystyrenes produced.

Differential Scanning Calorimetry (DSC)

DSC measurements were made on a TA Instruments Q2000 with helium purge gas and a Liquid Nitrogen Cooling System (LNCS) accessory for cooling. The sample was prepared in a TZero aluminum pan and scanned at 10° C./min over the temperature range of interest.

Fourier Transform Infrared Spectroscopy (FTIR)

The microstructures (cis, trans and vinyl contents) of the polymers were determined by FTIR. Specifically, the samples are dissolved in $CS_2$ and subjected to FTIR on a Perkin Elmer Spectrum GX instrument.

Viscoelastic Properties

Viscoelastic properties of cured rubber compounds were measured by a temperature sweep test conducted with an Advanced Rheometric Expansion System (ARES) from TA Instruments. The test specimen had a rectangular geometry having a length of 47 mm, a thickness of 2 mm, and a width of 12.7 mm. The length of specimen between the grips on the test machine, i.e., the gap, is approximately 27 mm. The test was conducted using a frequency of 62.8 rad/sec. The temperature is started at −100° C. and increased to 100° C. The strain is 0.1% or 0.25% for the temperature range of −100° C. to −10° C., and 2% for the temperature range of −10° C. and above.

Fracture Resistance

As stated above, a tensile test was carried out according to ASTM D412-15a to measure the tensile strength ($T_b$) of a vulcanized rubber composition, which is represented by an index on the basis that comparative example 1 in Table 4 is 100. The larger the index value, the better the fracture resistance.

Wear Resistance

The wear resistance of the test samples was evaluated using an abrasion test. Test specimens were rubber wheels of about 70 mm in outside diameter, about 30 mm in inside diameter and about 20 mm in thickness. The test specimens were placed on an axle and run at various slip ratios against a driven abrasive surface for various amounts of time. The abrading surface used was 240 grit sandpaper. A load of about 35 N was applied to the rubber wheel during testing. A linear, least squares curve-fit was applied to the weight loss data as a function of time. The slope of the line is the abrasion rate. The reported wear index is one-hundred multiplied by the control compound abrasion rate divided by the subject compound abrasion rate. Thus, a wear index greater than 100 indicates that the subject composition is better (abrades at a lower rate) than its respective control composition.

One or more aspects are disclosed in the present specification. According to a first aspect, a hydrogenated functionalized copolymer produced from the steps of: producing a living copolymer from the anionic polymerization of at least one conjugated diolefin monomer and at least one vinyl monomer; producing a functionalized copolymer by reacting the living copolymer with at least one silane modifier comprising an oxygen-containing moiety, wherein the oxygen atom of the oxygen-containing moiety is not directly bonded with the silicon atom; and producing the hydrogenated functionalized copolymer by hydrogenating the functionalized copolymer in the presence of a hydrogenation catalyst, wherein the hydrogenated functionalized copolymer has a degree of hydrogenation of 75% to 98 mol % as measured using proton nuclear magnetic resonance spectroscopy (1H NMR).

A second aspect includes any of the preceding aspects, wherein the silane modifier is free of one or more of sulfur, phosphorus, or nitrogen.

A third aspect includes any of the preceding aspects, wherein the oxygen atom of the oxygen-containing moiety is an oxygen heteroatom in a ring structure.

A fourth aspect includes any of the preceding aspects, the oxygen atom of the oxygen-containing moiety is a terminal oxygen atom.

A fifth aspect includes any of the preceding aspects, wherein the silane modifier comprise at least one alkoxysilyl group.

A sixth aspect includes any of the preceding aspects, wherein the alkoxysilyl group is selected from the group consisting of alkoxysilane compounds, aralkyloxysilane compounds, tetraalkoxysilane compounds, alkylalkoxysilane compounds, alkenylalkoxysilane compounds, and halogenoalkoxysilane compounds.

A seventh aspect includes any of the preceding aspects, wherein the alkoxysilyl functional group comprises trimethoxysilane, dimethoxysilane, or combinations thereof.

An eighth aspect includes any of the preceding aspects, wherein the hydrogenation catalyst comprises at least one nickel-containing composition.

A ninth aspect includes any of the preceding aspects, wherein the hydrogenation catalyst is free of titanium.

A tenth aspect includes any of the preceding aspects, wherein the hydrogenation catalyst further comprises at least one aluminum composition An eleventh aspect includes any of the preceding aspects, wherein the conjugated diolefin monomer comprises 1,3 butadiene, isoprene, myrcene, or combinations thereof, and wherein the vinyl monomer comprise styrene, alpha methyl styrene, or combinations thereof, and the silica reactive moieties comprises one or more groups selected from alkoxysilyl, hydroxyl, polyalkylene glycol, silanol, silyl halide, anhydride, organic acid, epoxy groups and combinations thereof.

A twelfth aspect includes any of the preceding aspects, wherein the functionalized copolymer has a vinyl content prior to hydrogenation of from 10 to 60%.

A thirteenth aspect includes any of the preceding aspects, wherein the copolymer is a styrene butadiene copolymer.

According to a fourteenth aspect, a rubber composition comprising: the hydrogenated functionalized copolymer of any preceding claim; at least one curative; and reinforcing filler.

A fifteenth aspect includes any of the preceding aspects, further comprising an additional rubber comprising natural rubber, synthetic rubber, or combinations thereof.

A sixteenth aspect includes any of the preceding aspects, wherein the reinforcing filler comprises silica, carbon black, or combinations thereof, and the curative comprises sulfur.

According to a seventeenth aspect, a method of making a hydrogenated functionalized copolymer comprising: introducing an anionic polymerization initiator, at least one conjugated diolefin monomer, at least one vinyl monomer, and solvent to a reactor to produce a living copolymer via anionic polymerization; reacting at least one silane modifier with the living copolymer to produce a functionalized copolymer, wherein the silane modifier comprises an oxygen-containing moiety, and wherein the oxygen atom of the oxygen-containing moiety is not directly bonded with the silicon atom; and hydrogenating the functionalized copolymer by mixing the functionalized copolymer with solvent and a hydrogenation catalyst in a hydrogen stream, wherein the hydrogenated functionalized copolymer has a degree of hydrogenation of 75% to 98 mol % as measured using 1H NMR.

An eighteenth aspect includes any of the preceding aspects, wherein the silane modifier is free of sulfur or nitrogen atoms.

A nineteenth aspect includes any of the preceding aspects, wherein the oxygen atom of the oxygen-containing moiety is an oxygen heteroatom in a ring structure.

A twentieth aspect includes any of the preceding aspects, wherein the oxygen atom of the oxygen-containing moiety is a terminal oxygen atom.

A twenty-first aspect includes any of the preceding aspects, wherein the silane modifier comprise at least one alkoxysilyl group.

A twenty-second aspect includes any of the preceding aspects, wherein the alkoxysilyl group is selected from the group consisting of alkoxysilane compounds, aralkyloxysilane compounds, tetraalkoxysilane compounds, alkylalkoxysilane compounds, alkenylalkoxysilane compounds, and halogenoalkoxysilane compounds.

A twenty-third aspect includes any of the preceding aspects, wherein the alkoxysilyl functional group comprises trimethoxysilane, dimethoxysilane, or combinations thereof.

A twenty-fourth aspect includes any of the preceding aspects, wherein the hydrogenation catalyst comprises at least one nickel-containing composition.

A twenty-fifth aspect includes any of the preceding aspects, wherein the hydrogenation catalyst is free of titanium.

A twenty-sixth aspect includes any of the preceding aspects, wherein the hydrogenation catalyst further comprises at least one aluminum composition.

A twenty-seventh aspect includes any of the preceding aspects, wherein the conjugated diolefin monomer comprises 1,3 butadiene, isoprene, myrcene, or combinations thereof, and wherein the vinyl monomer comprise styrene, alpha methyl styrene, or combinations thereof, and the silica reactive moieties comprises one or more groups selected from alkoxysilyl, hydroxyl, polyalkylene glycol, silanol, silyl halide, anhydride, organic acid, epoxy groups and combinations thereof.

A twenty-eighth aspect includes any of the preceding aspects, wherein the functionalized copolymer has a vinyl content prior to hydrogenation of from 10 to 60%.

A twenty-ninth aspect includes any of the preceding aspects, wherein the anionic polymerization initiator is a lithium catalyst.

A thirtieth aspect includes any of the preceding aspects, wherein the copolymer is a styrene butadiene copolymer.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A hydrogenated functionalized copolymer produced from the steps of:

producing a living copolymer from the anionic polymerization of at least one conjugated diolefin monomer and at least one vinyl aromatic monomer;

producing a functionalized copolymer by reacting the living copolymer with at least one silane modifier comprising an alkoxysilane compounds, arylalkylalkoxysilane compounds, tetraalkoxysilane compounds, alkylalkoxysilane compounds, alkenylalkoxysilane compounds, halogenoalkoxysilane compounds; and producing the hydrogenated functionalized copolymer by hydrogenating the functionalized copolymer in the presence of a hydrogenation catalyst comprising nickel, wherein the hydrogenated functionalized copolymer has a degree of hydrogenation of 75 mol % to 98 mol % as measured using proton nuclear magnetic resonance spectroscopy ($^1$H NMR);

wherein the functionalized copolymer has an initial vinyl content prior to hydrogenation of from 30% to 60%; and wherein the functionalized copolymer comprises from 10 wt % to 25 wt % styrene and from greater than 0% to 7.1% styrene block content, and wherein the styrene block comprises greater than or equal to three repeat styrene monomer units.

2. The hydrogenated functionalized copolymer of claim 1, wherein the at least one silane modifier is free of one or more of sulfur, phosphorus, or nitrogen.

3. The hydrogenated functionalized copolymer of claim 1, wherein the at least one silane modifier comprises an oxygen-containing moiety, and wherein an oxygen atom of the oxygen-containing moiety is not directly bonded with the silicon atom.

4. The hydrogenated functionalized copolymer of claim 1, wherein the at least one silane modifier comprises an oxygen-containing moiety, and wherein an oxygen atom of the oxygen-containing moiety is an oxygen heteroatom in a ring structure or a terminal oxygen atom.

5. The hydrogenated functionalized copolymer of claim 1, wherein the hydrogenation catalyst further comprises aluminum.

6. The hydrogenated functionalized copolymer of claim 1, wherein the at least one conjugated diolefin monomer comprises 1,3-butadiene, isoprene, myrcene, or combinations thereof, and wherein the at least one vinyl aromatic monomer comprise styrene, alpha methyl styrene, or combinations thereof.

7. The hydrogenated functionalized copolymer of claim 1, wherein the copolymer is a styrene butadiene copolymer.

8. A rubber composition comprising:

the hydrogenated functionalized copolymer of claim 1;

at least one curative; and reinforcing filler.

9. The rubber composition of claim 8, further comprising an additional rubber comprising natural rubber, synthetic rubber, or combinations thereof.

10. The rubber composition of claim 8, wherein the reinforcing filler comprises silica, carbon black, or combinations thereof, and the curative comprises sulfur.

11. The hydrogenated functionalized copolymer of claim 1, wherein the hydrogenation catalyst comprises a molar ratio of aluminum to nickel (Al/Ni) that is from 2:1 to 4:1.

* * * * *